(12) United States Patent
Cesa et al.

(10) Patent No.: US 12,706,779 B2
(45) Date of Patent: Aug. 11, 2026

(54) MULTI-REFERENCE ALIGNED CHANNEL ESTIMATION

(71) Applicant: QUALCOMM Incorporated, San Diego, CA (US)

(72) Inventors: Gabriele Cesa, Diemen (NL); Kumar Pratik, Amsterdam (NL); Arash Behboodi, Amsterdam (NL); Yuanning Yu, Santa Clara, CA (US); Jae Won Yoo, San Diego, CA (US); Manish Jain, San Jose, CA (US); Hari Sankar, San Diego, CA (US); Supratik Bhattacharjee, San Diego, CA (US); Joseph Binamira Soriaga, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 48 days.

(21) Appl. No.: 19/016,644

(22) Filed: Jan. 10, 2025

(65) Prior Publication Data

US 2026/0205326 A1 Jul. 16, 2026

(51) Int. Cl.
*H04L 25/02* (2006.01)
*H04B 7/0456* (2017.01)

(52) U.S. Cl.
CPC ....... *H04L 25/0204* (2013.01); *H04B 7/0456* (2013.01)

(58) Field of Classification Search
CPC .......................... H04L 25/0204; H04B 7/0456
See application file for complete search history.

(56) References Cited

U.S. PATENT DOCUMENTS

2020/0067663 A1* 2/2020 Liu .................. H04W 72/1268
2020/0204406 A1* 6/2020 Zhang .................. H04B 7/0456
2020/0366344 A1* 11/2020 Davydov ............. H04L 5/0007
2021/0112525 A1* 4/2021 Sarkis .................. H04L 1/0072
2024/0137081 A1* 4/2024 Kwak ................. H04B 7/0456

OTHER PUBLICATIONS

Cesa G., et al., "Equivariant Self-supervised Deep Pose Estimation for Cryo EM", Proceedings of 2nd Annual Workshop on Topology, Algebra, and Geometry in Machine Learning (TAG-ML), Jun. 18, 2023, pp. 1-15.

(Continued)

*Primary Examiner* — Janice N Tieu
(74) *Attorney, Agent, or Firm* — Dinsmore & Shohl LLP

(57) ABSTRACT

Certain aspects of the present disclosure provide techniques for wireless communications. An example method includes receiving a first transmission comprising a first reference signal and a second transmission comprising a second reference signal, wherein at least one of: the first transmission comprises a first physical resource block group (PRG) and the second transmission comprises a second PRG, or the first transmission is in a first time resource and the second transmission is in a second time resource; estimating, using the first reference signal and the second reference signal, a precoding misalignment between the first transmission and the second transmission; and estimating, based on the precoding misalignment, a first channel for the first transmission and a second channel for the second transmission.

20 Claims, 14 Drawing Sheets

(56) References Cited

OTHER PUBLICATIONS

Gelfand S. I., et al., "Coding for Channel with Random Parameters", Problems of Control and Information Theory, vol. 9 (1) (1980), Jan. 20, 1979, pp. 19-31.
Gizzini A.K., et al., "CNN Aided Weighted Interpolation for Channel Estimation in Vehicular Communications", Jan. 17, 2022, Information Theory, pp. 1-16.
Ha A. L., et al., "Deep Learning-Aided 5G Channel Estimation", Jan. 17, 2021, Information Theory, 7 Pages.
Kim Y-H., et al., "State Amplification", IEEE Transactions on Information Theory (vol. 54, Issue: 5, May 2008), Apr. 22, 2008, pp. 1850-1859.
Li L., et al., "Deep Residual Learning Meets OFDM Channel Estimation", IEEE Wireless Communications Letters ( vol. 9, Issue: 5, May 2020), Dec. 27, 2019, pp. 1-4.
Romanov E., et al., "Multi-Reference Alignment in High Dimensions: Sample Complexity and Phase Transition", SIAM Journal on Mathematics of Data Science 3.2 (2021), Sep. 30, 2021, pp. 1-39.
Ru X., et al., "Model-Driven Channel Estimation for OFDM Systems Based on Image Super-Resolution Network", Signal Processing, Nov. 29, 2019, 5 Pages.
Soltani M., et al., "Deep Learning-Based Channel Estimation", Feb. 19, 2019, Information Theory, 4 Pages.
Stuber G.L., et al., "Broadband MIMO-OFDM Wireless Communications", Proceedings of the IEEE, Feb. 29, 2004, vol. 92, No. 2, pp. 271-294. Abstract.
Sun Y., et al., "ICINet: ICI-Aware Neural Network Based Channel Estimation for Rapidly Time-Varying OFDM Systems", Signal Processing, Jun. 18, 2021, pp. 1-5.
Yang A., et al., "Deep Learning Based OFDM Channel Estimation Using Frequency-Time Division and Attention Mechanism", Information Theory, Sep. 30, 2021, 6 Pages.

* cited by examiner

One Frame (TDD)
10 ms
400
subframe
RB
slot
DMRS $R_x$
CSI-RS
D D D D D D D D D D D D X U
subcarrier
OFDM symbol 430
SS/PBCH Block
PSS
SSS
PBCH
PDCCH
PDSCH
20 RBs
system bandwidth RBs 450
SRS Comb 0
SRS Comb 1
DMRS R
D X U U U U U U U U U U U U
SRS

480
PUCCH
PUSCH

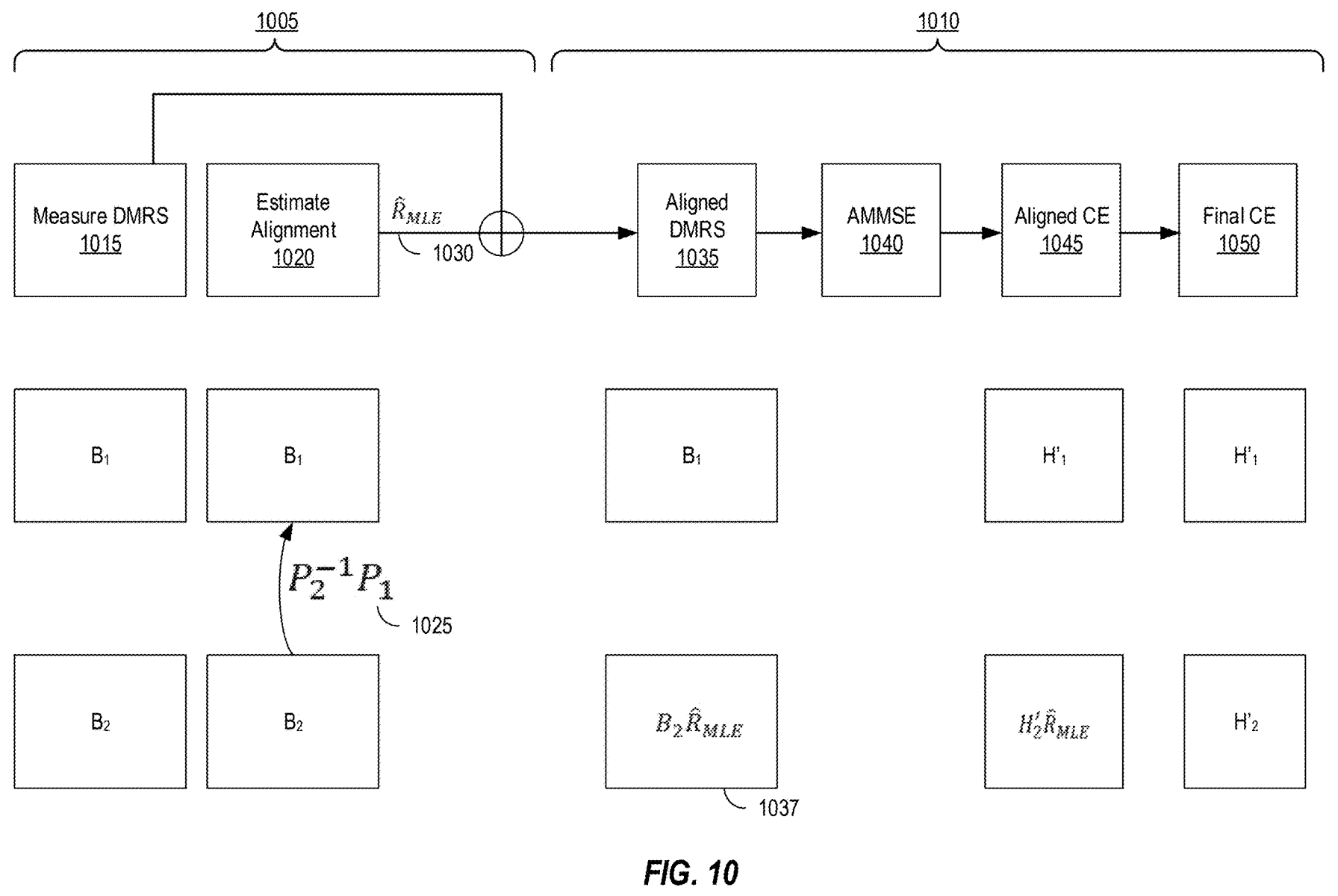

1005

1010

Measure DMRS 1015

Estimate Alignment 1020

$\hat{R}_{MLE}$

1030

Aligned DMRS 1035

AMMSE 1040

Aligned CE 1045

Final CE 1050

$B_1$ $B_1$ $B_1$ $H'_1$ $H'_1$ $B_2$ $B_2$ $P_2^{-1}P_1$

1025

$B_2\hat{R}_{MLE}$

1037

$H'_2\hat{R}_{MLE}$ $H'_2$

FIG. 10

MULTI-REFERENCE ALIGNED CHANNEL ESTIMATION

INTRODUCTION

Field of the Disclosure

Aspects of the present disclosure relate to wireless communications, and more particularly, to techniques for multi-reference aligned channel estimation.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

Certain aspects provide a method for wireless communications by an apparatus. The method includes receiving a first transmission comprising a first reference signal and a second transmission comprising a second reference signal, wherein at least one of: the first transmission comprises a first physical resource block group (PRG) and the second transmission comprises a second PRG, or the first transmission is in a first time resource and the second transmission is in a second time resource; estimating, using the first reference signal and the second reference signal, a precoding misalignment between the first transmission and the second transmission; and estimating, based on the precoding misalignment, a first channel for the first transmission and a second channel for the second transmission.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 10 provides an example of channel estimation using the precoding misalignment.

DETAILED DESCRIPTION

Figure 1:
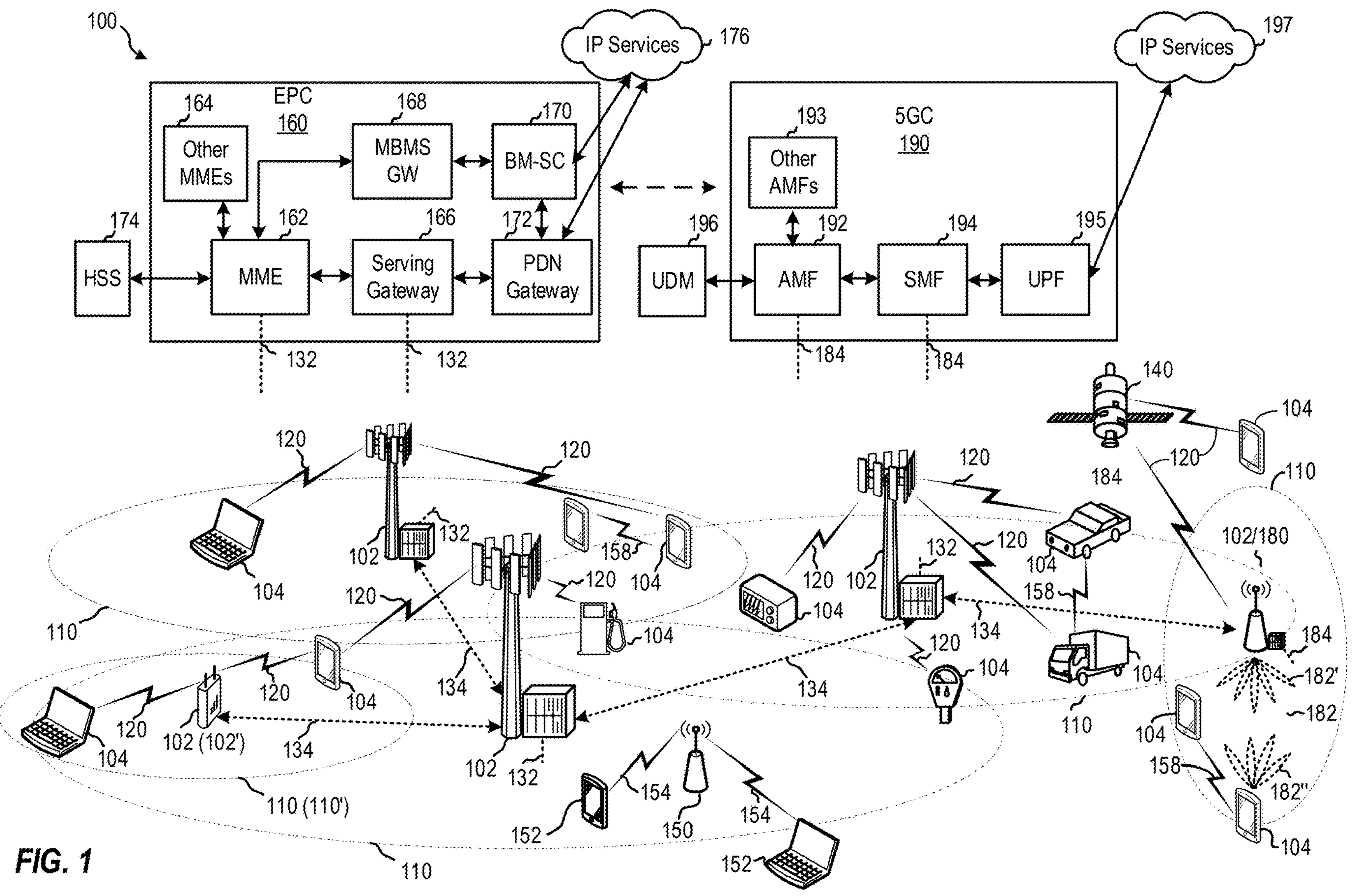
FIG. 1 depicts an example wireless communications network.

Aspects of the present disclosure provide apparatuses, methods, processing systems, and computer-readable mediums for multi-reference aligned channel estimation.

In some aspects of wireless communication, e.g., a fast fading environment, obtaining accurate channel state information (CSI) may be important to maintain high data throughput. Orthogonal frequency division multiplexing (OFDM) systems often deploy pilot-based channel estimation techniques for obtaining CSI with sufficient accuracy. In some aspects of wireless communication, e.g., 5G NR, these pilot symbols may be referred to as demodulation reference signals (DMRS). In every transmission slot, DMRS symbols may be inserted for effective channel estimation used for demodulation at non-DMRS locations in that slot. In some aspects a fixed set of possible DMRS patterns may be configured and/or allowed. Depending on the channel characteristics, the optimal DMRS pattern, i.e., the DMRS pattern with the best expected data throughput, may be used. Channel estimation, in some aspects, involves finding the unknown values of the channel response (e.g., at non-DMRS locations) using some known channel responses at pilot locations (e.g., DMRS locations). It may be beneficial to perform channel estimation using combined measurements, such as across physical resource block groups in frequency or across slots in time.

Multiple-input multiple-output (MIMO) communication involves the transmission and reception of signals using multiple antennas. One form of MIMO communication is narrowband MIMO, in which a plurality of physical resource block (PRB) groups (PRGs) can use different precoders in the same resource. In this situation, a user equipment (UE) may not have knowledge of the different precoders. Thus, it may be difficult to perform channel estimation across multiple PRGs or slots. Some forms of machine-learning-based interpolation or combination of channel estimation across PRGs or slots have been proposed, but these techniques may be computationally intensive and difficult to implement in hardware.

Aspects of the present disclosure relate generally to channel estimation across PRGs or slots that use different precoders. For example, a UE may receive a first transmission comprising a first reference signal (e.g., DMRS) and a second transmission comprising a second reference signal (e.g., DMRS). The first transmission may be on a first PRG and/or in a first slot, and the second transmission may be on a second PRG and/or in a second slot. The UE may estimate a precoding misalignment between the first transmission and the second transmission. The precoding misalignment indicates an estimated difference between a precoder of the first transmission and a precoder of the second transmission. For example, the precoding misalignment may represent a correlation across differently-precoded time slots or PRGs. The UE may estimate a first channel for the first transmission and a second channel for the second transmission based on the precoding misalignment. For example, the precoding misalignment may be an additional input to a channel estimation algorithm, which improves accuracy of the channel estimation. Thus, accuracy of channel estimation is improved and combination of channel measurements across PRGs or slots with different precoders is enabled.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 may include terrestrial aspects, such as ground-based network entities (e.g., BSs 102), and non-terrestrial aspects (also referred to herein as non-terrestrial network entities). A non-terrestrial network entity may include satellite 140, which may be an example of an aerial or space-borne platform. In some examples, satellite 140 may include one or more network entities on-board (e.g., one or more BSs) capable of communicating with other network elements (e.g., terrestrial BSs) and UEs. For example, satellite 140 may be implemented according to a regenerative architecture (also referred to as a non-transparent architecture), and a gNB implemented at satellite 140 may implement higher-layer network functions. As another example, satellite 140 may be implemented according to a transparent architecture, and may perform a physical or other lower-layer repeater function for UEs and a network entity (such as a gateway associated with the satellite 140).

In the depicted example, wireless communications network 100 includes BSs 102, UEs 104, and one or more core networks, such as an Evolved Packet Core (EPC) 160 or a 5G Core (5GC) network 190, which interoperate to provide communications services over various communications links, including wired and wireless links. In some aspects, a core network, such as a 6G core, may implement a converged service-based architecture. In a converged service-based architecture, functions traditionally split between a core network (such as 5GC network 190) and a radio access network (RAN) (such as BS 102) may be implemented at a single network entity. For example, a mobility network entity may perform both core network functions and RAN functions related to mobility of UEs 104 attached to the wireless communications network 100. "Network entity" can refer to a BS 102, a network entity of EPC 160 or 5GC network 190, or a network entity of a converged service-based architecture.

FIG. 1 depicts various example UEs 104. UE 104 may include a cellular phone, a smart phone, a session initiation protocol (SIP) phone, a laptop, a personal digital assistant (PDA), a satellite radio, a Global Positioning System device, a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an Internet of Things (IoT) device, an always on (AON) device, an edge processing device, a data center, or another similar device. A UE 104 may also be referred to as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. A communications link 120 between a BS 102 and a UE 104 may include uplink (UL) (also referred to as reverse link) transmissions from a UE 104 to a BS 102 and/or downlink (DL) (also referred to as forward link) transmissions from a BS 102 to a UE 104. A communications link 120 may use multiple-input and multiple-output (MIMO) antenna technology, including spatial multiplexing, beamforming, and/or transmit diversity in various aspects.

A BS 102 may include a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point (TRP), a radio unit (RU), a distributed unit (DU), or the like. A given BS 102 may provide communications coverage for a coverage area 110, which may sometimes be referred to as a cell, and which may overlap another coverage area 110 (e.g., a small cell provided by a BS 102') may have a coverage area 110' that overlaps the coverage area 110 of a macro cell). A BS 102 may, for example, provide communications coverage for a macro cell (covering a relatively large geographic area), a pico cell (covering a relatively smaller geographic area, such as a sports stadium), a femto cell (covering a relatively smaller geographic area, such as a home), or another type of cell.

The term "cell" may refer to a portion, partition, or segment of wireless communication coverage served by a network entity within a wireless communications network 100. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms "cell" or "serving cell" may refer to or correspond to a specific carrier frequency (e.g., a component carrier) used for wireless communications, and a "cell group" may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
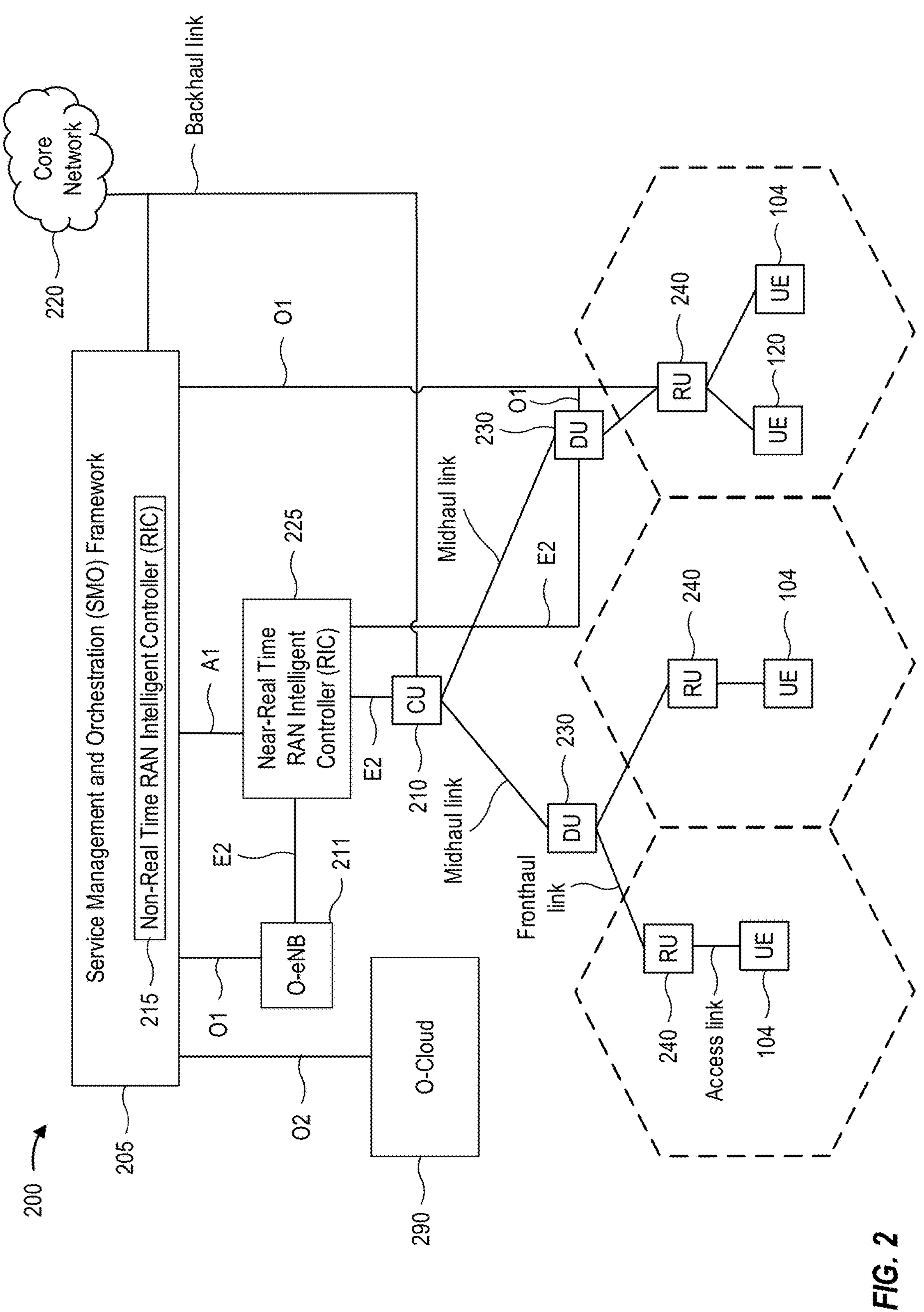
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more DUs, one or more RUs, a Near-Real Time (Near-RT) RAN Intelligent Controller (RIC), or a Non-Real Time (Non-RT) RIC, to name a few examples. In another example, various aspects of a base station may be virtualized. A base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. Implementing a base station in this fashion may provide efficiency gains by enabling cloud-based implementation of certain (e.g., non-time-sensitive) higher-layer functions while physical-layer or other lower-layer functions can be implemented at or in proximity to a geographic coverage area of a corresponding cell. In some aspects, a base station including components that are located at various physical locations may be referred to as having a disaggregated RAN architecture, such as an Open RAN (O-RAN) or Virtualized RAN (VRAN) architecture. FIG. 2 depicts and describes an example disaggregated RAN architecture.

Different BSs 102 within wireless communications network 100 may also be configured to support different radio access technologies, such as 3G, 4G, 5G, and/or 6G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or the 5GC 190) with each other over third backhaul links 134 (e.g., an X2 or XN interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, the Third Generation Partnership Project (3GPP) currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

A communications links 120 may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 180 in FIG. 1) may utilize beamforming (indicated by reference number 182) with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may perform beam training to determine suitable receive and transmit directions for each of BS 180 and UE 104. Notably, the transmit and receive directions for BS 180 may or may not be the same. Similarly, the transmit and receive directions for UE 104 may or may not be the same.

Wireless communications network 100 may include a Wi-Fi access point (AP) 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. In some examples, D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH). D2D communications link 158 may be implemented using a variety of technologies, such as a radio access technology (e.g., 5G, ProSe sidelink), a WiFi technology, a Bluetooth technology, or the like.

EPC 160 may include various functional components, such as a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172. MME 162 may be in communication with a Home Subscriber Server (HSS) 174. MME 162 is a control node that processes signaling between the UEs 104 and the EPC 160. Generally, MME 162 provides bearer and connection management.

Generally, user Internet protocol (IP) packets are transferred through Serving Gateway 166. Serving gateway 166 is connected to PDN Gateway 172. PDN Gateway 172 provides UE IP address allocation as well as other functions. PDN Gateway 172 and BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, such as an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and the 5GC 190. AMF 192 provides, for example, quality of service (QoS) flow and session management.

IP packets are transferred through UPF 195, which is connected to the IP Services 197. UPF 195 may provide UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a core network entity, or a sidelink node, to name a few examples.

FIG. 2 depicts an example disaggregated base station 200 architecture. The disaggregated base station 200 architecture may include one or more CUs 210 that can communicate directly with a core network 220 or other CUs 210 via a backhaul link (such as backhaul link 134), or indirectly with the core network 220 through one or more disaggregated base station units (such as a Near-Real Time (Near-RT) RAN Intelligent Controller (RIC) 225 via an E2 link, a Non-Real Time (Non-RT) RIC 215 associated with a Service Management and Orchestration (SMO) Framework 205, or both). A CU 210 may communicate with one or more DUs 230 via respective midhaul links, such as an F1 interface. The DUs 230 may communicate with one or more RUs 240 via respective fronthaul links. The RUs 240 may communicate with respective UEs 104 via one or more radio frequency (RF) access links (such as communication link 120). In some implementations, a UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or a processor or controller providing instructions to the interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter, or a transceiver (such as a RF transceiver), configured to receive or transmit signals, or both, over a wireless transmission medium.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration.

The CU 210 can be implemented to communicate with the DU 230 for network control and signaling.

The DU 230 may be or correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
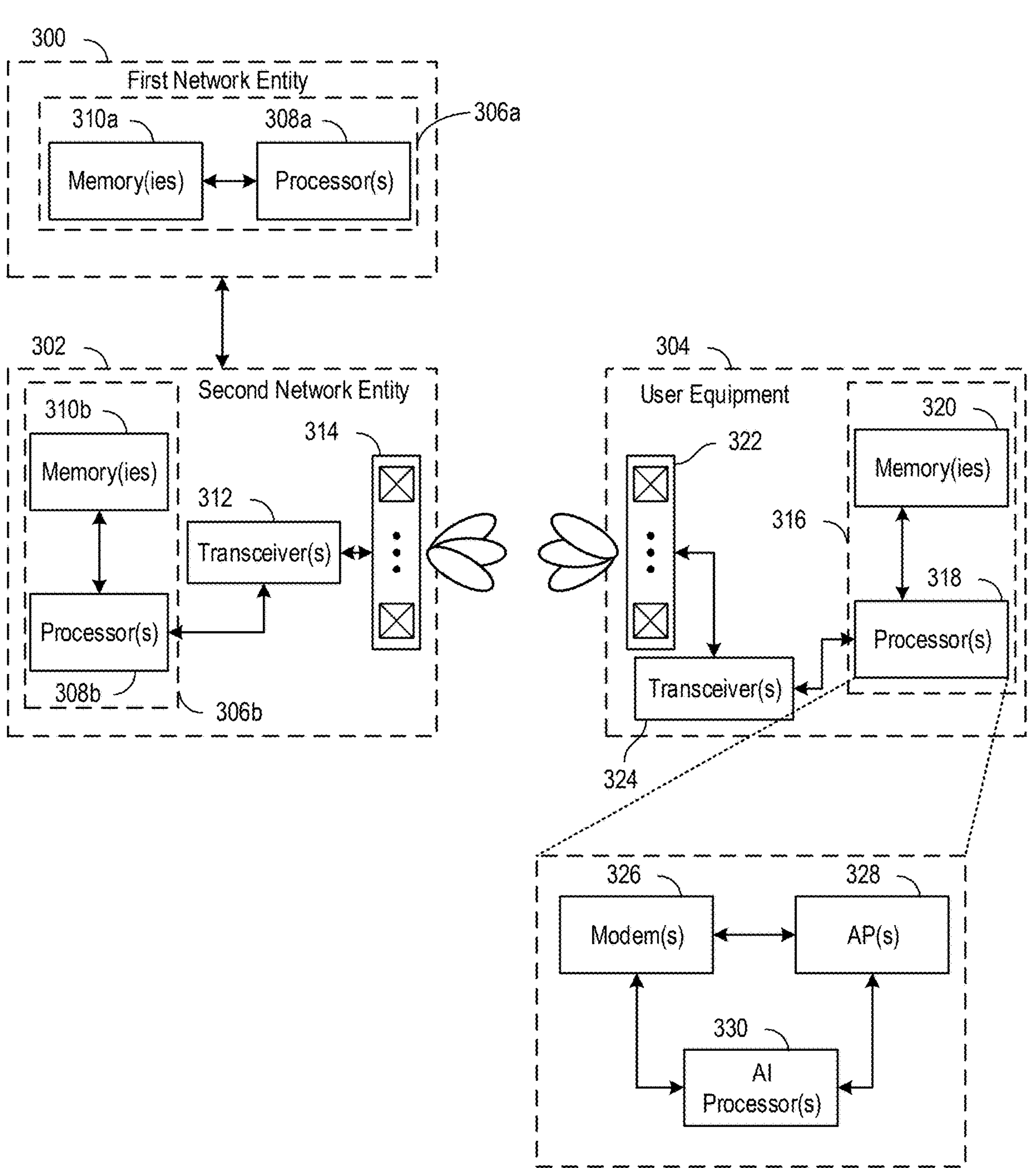
FIG. 3 depicts aspects of network entities and a user equipment (UE).

FIG. 3 depicts aspects of network entities 300 and 302 and a UE 304.

FIG. 3 includes a first network entity 300 and a second network entity 302. In some examples, first network entity 300 may be an example of a CU 210 or a DU 230. In some examples, second network entity 302 may be an example of a DU 230 or an RU 240. First network entity 300 and second network entity 302 may communicate with one another via a communications link, such as a midhaul link. In some examples, first network entity 300 and second network entity 302 may be implemented at a same BS (e.g., BS 102). For example, first network entity 300 and second network entity 302 may be co-located. In some other examples, first network entity 300 may be implemented separately from second network entity 302. For example, first network entity 300 may be implemented as a function (e.g., one or more processes) running on a server, such as in a cloud (e.g., a public or private cloud). As another example, first network entity 300 may be implemented as a virtual computing instance (e.g., virtual machine, container, etc.) or as a physical server.

First network entity 300 and second network entity 302 each include a processing system 306, illustrated as "processing system 306*a*" at first network entity 300 and "processing system 306*b*" at second network entity 302. For example, first network entity 300 and second network entity 302 may include one or more chips, system-on-chips (SoCs), system-in-packages (SiPs), chipsets, packages, or devices that individually or collectively constitute or comprise a processing system 306. A processing system 306 includes one or more processors 308 (illustrated as "processor(s) 308*a*" and "processor(s) 308*b*") and one or more memories 310 (illustrated as "memory(ies) 310*a*" and "memory(ies) 310*b*") coupled to the one or more processors 308. The one or more processors 308 may include one or multiple processors, microprocessors, processing units (such as central processing units (CPUs), graphics processing units (GPUs), neural processing units (NPUs) (also referred to as neural network processors or deep learning processors (DLPs)) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (any one or more of which may be generally referred to herein individually as a "processor" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set. In some other examples, each of a group of processors may be configurable or configured to perform a same set of functions.

In some aspects, the processing system 306 may perform processing (such as digital signal processing) of data, control information, or signals received or transmitted by a network entity. For example, the processing system 306 may include a coder, a decoder, a multiplexer, a demultiplexer, a transmit MIMO processor, a transmit processor, a receive processor, a receive MIMO detector, an automatic gain control component, or the like.

The one or more memories 310 may include one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). The one or more memories 310 may store data and program code for first network entity 300 and/or second network entity 302.

As further shown, second network entity 302 includes one or more transceivers 312 (illustrated as "transceiver(s) 312"). The one or more transceivers 312 may perform processing related to implementing physical layer (e.g., radio, air interface) communication with other devices such as UE 304. The one or more transceivers 312 may include one or more radio frequency (RF) components, such as an RF transceiver, a front-end module (e.g., an RF front-end (RFFE)), or the like. For example, the one or more transceivers 312 may include a transmit path (also referred to as a transmit chain), a receive path (also referred to as a receive chain), and/or an interface with one or more antennas 314.

The one or more antennas 314 may perform wireless transmission and reception of signals. The one or more antennas 314 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 3.

UE 304 may be an example of UE 104. As shown, UE 304 includes a processing system 316. For example, UE 304 may include one or more chips, SoCs, SiPs, chipsets, packages, or devices that individually or collectively constitute or comprise a processing system 316. A processing system 316 includes one or more processors 318, and one or more memories 320 coupled to the one or more processors 318. Further, UE 304 includes one or more antennas 322, one or more transceivers 324, and/or other components that enable wireless transmission and reception of data.

The one or more processors 318 may include one or multiple processors, microprocessors, processing units (such as CPUs, GPUs, NPUs (also referred to as neural network processors or DLPs) and/or DSPs), processing blocks, ASICs, PLDs (such as FPGAs), or other discrete gate or transistor logic or circuitry (any one or more of which may be generally referred to herein individually as a "processor" or collectively as "the processor" or "the processor circuitry"). One or more of the processors may be individually or collectively configurable or configured to perform various functions or operations described herein. In some aspects, the processing system 316 may perform processing (such as digital signal processing) of data, control information, or signals received or transmitted by a network entity. For example, the processing system 316 may include a coder, a decoder, a multiplexer, a demultiplexer, a transmit MIMO processor, a transmit processor, a receive processor, a receive MIMO detector, an automatic gain control component, or the like.

As shown, in some examples, the one or more processors 318 may include one or more modems 326, one or more application processors (APs) 328, one or more AI processors 330, a combination thereof, and/or another form of processor.

The one or more modems 326 may include a digital signal processor that converts information into a waveform for analog signal transmission (e.g., via modulation) and/or converts the waveform of a received signal into information (e.g., via demodulation). The one or more modems 326 may process information or waveforms in connection with signal transmission or reception. For example, the one or more modems 326 may include a coder, a decoder, a multiplexer, a demultiplexer, a transmit MIMO processor, a transmit processor, a receive processor, a receive MIMO detector, an automatic gain control component, or the like.

The one or more APs 328 may perform processing relating to an operating system and/or a higher layer application of the UE 304. For example, the one or more APs 328 may provide a higher-level operating system (HLOS), software, audio or video processing, graphics processing, or the like. In some examples, the one or more APs 328 may be a data source (e.g., for transmissions) or a data sink (e.g., for receptions).

The one or more transceivers 324 may perform processing related to implementing physical layer (e.g., radio, air interface) communication with other devices such as other UEs 304 or second network entity 302. The one or more transceivers 324 may include one or more RF components, such as an RF transceiver, a front-end module (e.g., an RFFE), or the like. For example, the one or more transceivers 324 may include a transmit path (also referred to as a transmit chain), a receive path (also referred to as a receive chain), and/or an interface with one or more antennas 322.

The one or more antennas 322 may perform wireless transmission and reception of signals. The one or more antennas 322 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 3.

For an example downlink transmission by second network entity 302, the processing system 306 (e.g., a transmit processor) may receive data and/or control information. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

The processing system 306 (e.g., a transmit processor) may process (e.g., encode and symbol map) the data and control information to obtain data symbols and control symbols, respectively. The processing system 306 may also generate reference symbols, such as for the primary synchronization signal (PSS), secondary synchronization signal (SSS), PBCH demodulation reference signal (DMRS), or channel state information reference signal (CSI-RS).

The processing system 306 (e.g., a TX MIMO processor) may perform spatial processing (e.g., precoding) on the data symbols, the control symbols, and/or the reference symbols, if applicable, and may provide output symbol streams to one or more modulators of the processing system 306. The one or more modulators may process one or more respective output symbol streams to obtain an output sample stream. The one or more transceivers 312 may process (e.g., convert to analog, amplify, filter, and upconvert) the output sample stream to obtain a downlink signal. Second network entity 302 may transmit the downlink signal via the one or more antennas 314.

In order to receive the downlink transmission at UE 304 (or a sidelink transmission from another UE), the one or more antennas 322 may receive the downlink signal and may provide received signals to the one or more transceivers 324. The one or more transceivers 324 may condition (e.g., filter, amplify, downconvert, and digitize) the received signals to obtain input samples. The one or more transceivers 324 and/or the processing system 316 may further process the input samples to obtain received symbols.

The processing system 316 (e.g., modem 326, an RX MIMO detector) may obtain the received symbols, perform MIMO detection on the received symbols if applicable, and provide detected symbols. The processing system 316 (e.g., a modem 326, a receive processor) may process (e.g., de-interleave and decode) the detected symbols. The processing system 316 may provide decoded data for the UE 304 (e.g., to an AP 328) and/or decoded control information (e.g., to a controller/processor of the processing system 316).

For an example uplink transmission or a sidelink transmission from UE 304, the processing system 316 (e.g., modem 326, a transmit processor) may receive and process data and/or control information to obtain a set of symbols for transmission. The data may be for the physical uplink shared channel (PUSCH), and may be received from a data source such as the AP 328. The control information may be for the physical uplink control channel (PUCCH), and may be received, for example, from a controller/processor of the processing system 316. The processing system 316 (e.g., a modem 326, the transmit processor) may also generate reference symbols for a reference signal (e.g., for a sounding reference signal (SRS), a demodulation reference signal, a phase tracking reference signal, or the like). In some examples, the symbols and/or reference signals may be precoded by the processing system 316 (e.g., modem 326, a TX MIMO processor), further processed by the one or more transceivers 324 (e.g., for SC-FDM), and transmitted to second network entity 302.

At second network entity 302, the uplink signals from UE 304 may be received by the one or more antennas 314, conditioned by the one or more transceivers 312 (e.g., filtered, amplified, downconverted, and digitized), detected (e.g., by the processing system **306*b* such as a modem and/or an RX MIMO detector), and further processed by the processing system 306*b* (e.g., a modem and/or a receive processor) to obtain decoded data and control information sent by UE 304. The processing system 306*b* may provide the decoded data and the decoded control information (such as to a controller/processor of the processing system 306*b*, an AP, first network entity 300**, or another entity).

In various aspects, a wireless communication device, such as first network entity 300, second network entity 302, BS 102, UE 104, or UE 304 may be described as sending, transmitting, obtaining, or receiving various types of data associated with the methods described herein. In these contexts, "transmitting" or "sending" may refer to various mechanisms of outputting data, such as outputting data from a processing system, one or more memories, one or more transceivers, one or more antennas, and/or other aspects described herein. For example, "sending" or "transmitting" by a device may include sending (such as wirelessly, via a wired connection, or both) to a recipient directly or via another device. As another example, "sending" or "transmitting" may include sending internally to a device (such as the UE 304, first network entity 300, or second network entity 302) by a process to memory. "Receiving" or "obtaining" may refer to various mechanisms of obtaining data, such as obtaining data from the processing system, one or more memories, one or more transceivers, one or more antennas, and/or other aspects described herein. For example, "receiving" or "obtaining" by a device may include obtaining (such as wirelessly, via a wired connection, or both) from a recipient directly or via another device. As another example, "receiving" or "obtaining" may include obtaining internally to a device (such as the UE 304, first network entity 300, or second network entity 302) by a process from memory. As used herein, "communicating" by a device may include sending, obtaining, receiving, and/or transmitting a communication. "Communicating" can refer to communication with another device or internal communication of the device.

In various aspects, the processing system 306 or the processing system 316 may include one or more AI processors (such as AI processor 330 of the processing system 316). An AI processor may perform AI processing. The AI processor may include AI accelerator hardware or circuitry such as one or more neural processing units (NPUs), one or more neural network processors, one or more tensor processors, one or more deep learning processors, etc. As an example, the AI processor may perform AI-based beam management, AI-based channel state feedback (CSF), AI-based antenna tuning, and/or AI-based positioning (e.g., non-line of sight positioning prediction). In some cases, at the UE 104, the AI processor may process feedback generated by the UE 304 (e.g., CSF) using hardware accelerated AI inferences and/or AI training. In some cases, at the second network entity 302, the AI processor may decode compressed CSF from the UE 304, for example, using a hardware accelerated AI inference associated with the CSF. In certain cases, the AI processor may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figures 4A, 4B, 4C, 4D:
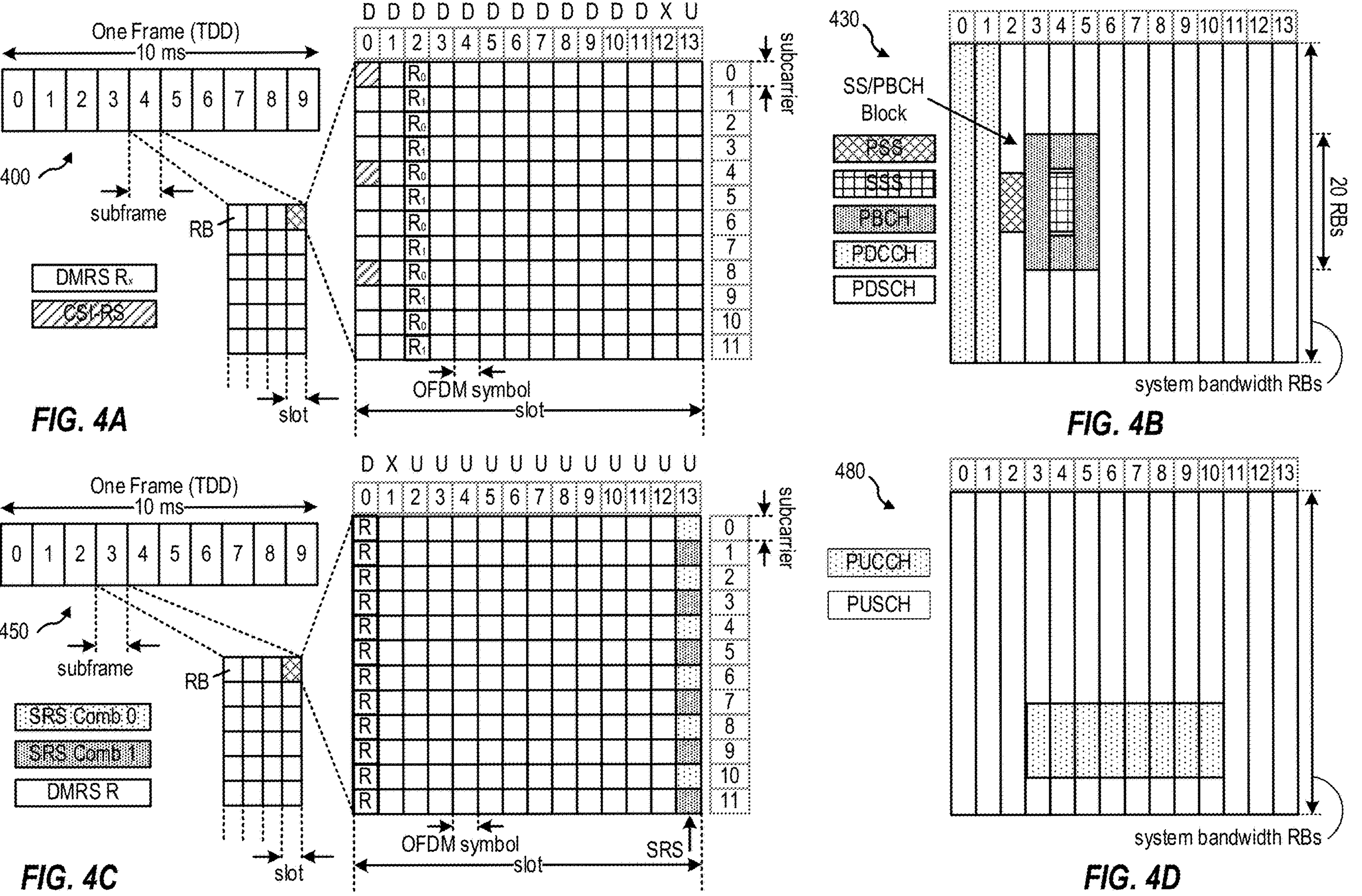
FIGS. 4A, 4B, 4C, and 4D depict various example aspects of data structures for a wireless communications network.

FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. One or more subcarriers may be modulated with data. Modulation symbols may be sent in the frequency domain with OFDM and/or in the time domain with SC-FDM.

In some examples, a wireless communications frame structure may be implemented using frequency division duplexing (FDD). In FDD, some subcarriers may be configured for DL communication, and other subcarriers (which may overlap in time with the DL subcarriers) may be configured for UL communication. In some other examples, wireless communications frame structures may be implemented using time division duplexing (TDD). In TDD, for a particular set of subcarriers, some subframes are configured for DL communication and other subframes are configured for UL communication.

In FIGS. 4A and 4C, the wireless communications frame structure is implemented using TDD. "D" indicates DL time resources, "U" indicates UL time resources, and "X" indicates flexible time resources for use or later reconfiguration for either DL or UL communication. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology. A numerology may define a frequency domain subcarrier spacing and symbol duration, and may be configured for a given bandwidth part, carrier, cell, or network entity. In certain aspects, given a numerology p, there are 2 slots per subframe. Thus, numerologies (p) 0 to 6 may allow for 1, 2, 4, 8, 16, 32, and 64 slots, respectively, per subframe. In some cases, an extended CP (e.g., 12 symbols per slot) may be used with a specific numerology, such as numerology p=2 allowing for 4 slots per subframe. The subcarrier spacing and symbol length/duration are a function of the numerology. The subcarrier spacing may be equal to 2×15 kHz. As an example, the numerology p=0 corresponds to a subcarrier spacing of 15 kHz, and the numerology p=6 corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology p=2 with 4 slots per subframe. In such a case, the slot duration is 0.25 ms, the subcarrier spacing is 60 kHz, and the symbol duration is approximately 16.67 s.

As depicted in FIGS. 4A, 4B, 4C, and 4D, a resource grid may be used to represent the frame structure. Each time slot includes a resource block (RB) (also referred to as a physical RB (PRB)) that extends across, for example, 12 consecutive subcarriers. The resource grid is divided into multiple resource elements (REs). An RE may include a single subcarrier in the frequency domain and a single symbol in the time domain. The number of bits carried by each RE depends on the modulation scheme including, for example, quadrature phase shift keying (QPSK) or quadrature amplitude modulation (QAM). In some cases, "PRB" may refer to a resource allocation including a slot (e.g., 14 symbols) and 12 consecutive subcarriers.

As illustrated in FIG. 4A, some of the REs carry reference (pilot) signals (shown as "RS") for a UE (e.g., UE 104 of FIGS. 1 and 3). The RS may include a demodulation RS (DMRS) and/or a channel state information reference signals (CSI-RS) for channel estimation at the UE. The RS may additionally or alternatively include a beam measurement RS (BRS), a beam refinement RS (BRRS), and/or a phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block (SSB), and in some cases, referred to as a synchronization signal block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as "R" for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
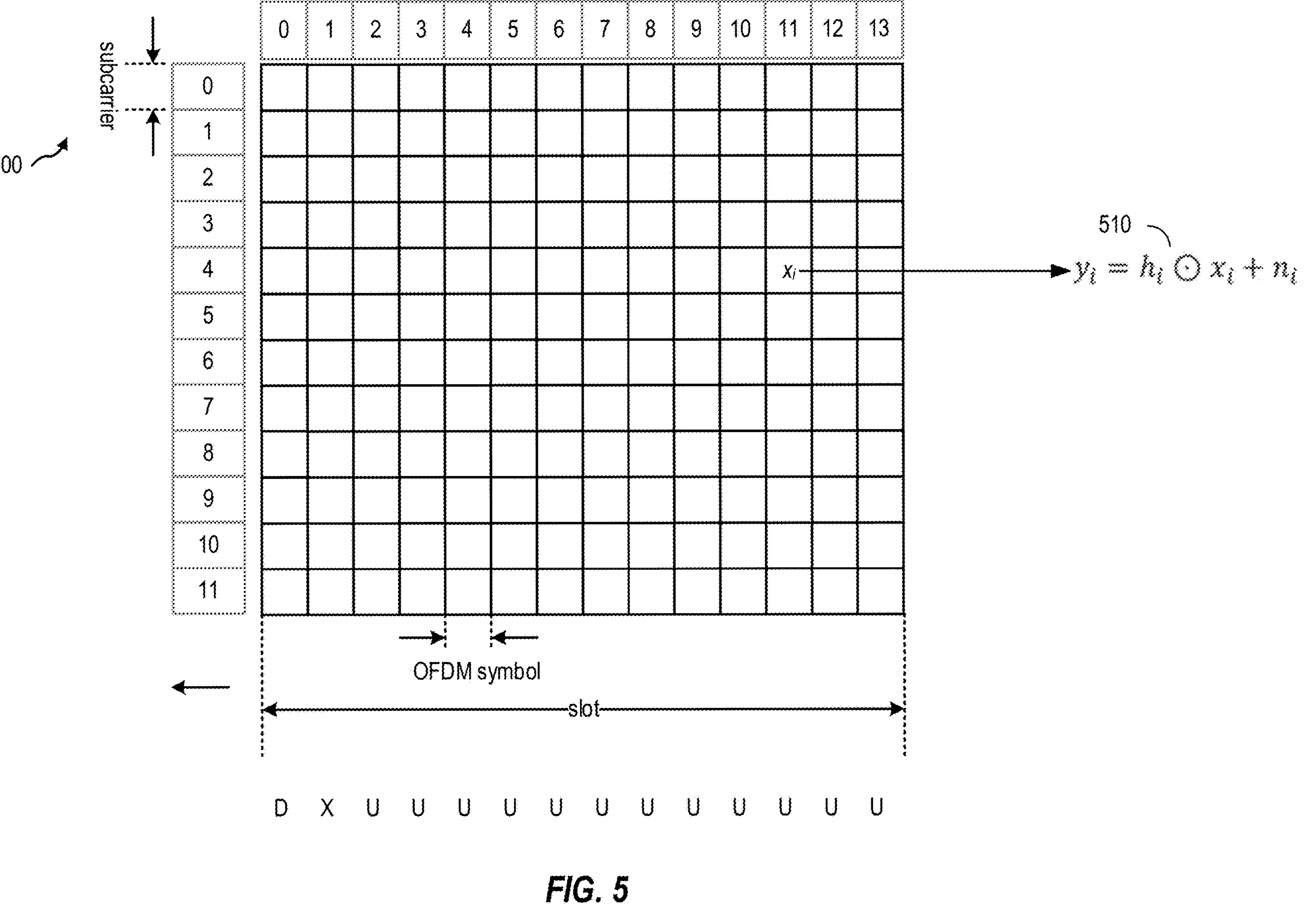
FIG. 5 is a diagram illustrating an example of a channel model for a physical resource block (PRB).

FIG. 5 is a diagram illustrating an example 500 of a channel model 510 for a PRB, such as the PRB illustrated in the diagram 400. A signal transmitted on an RE i (in example 500, the RE in slot 11 and subcarrier 4) may be represented by $x_i$. The parameter $n_i$ represents noise on the RE. The parameter $h_1$ represents a channel experienced by the transmitted signal, and can be represented as a vector or a scalar (depending on the number of transmit antennas and receive antennas). Thus, a received signal $y_i$ at the RE i may be represented as $y_i=h_i \cdot x_i+n_i$.

Figure 6:
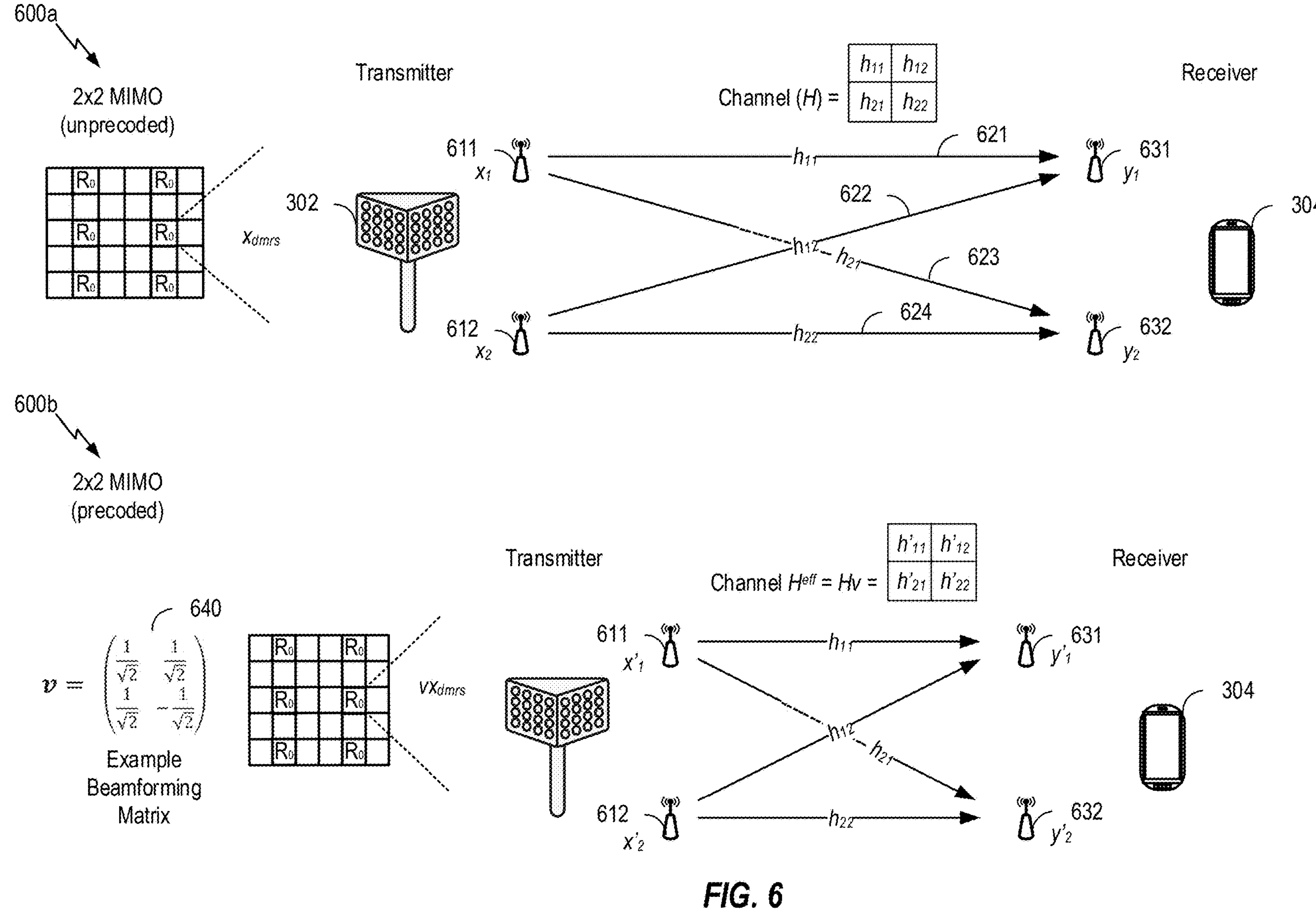
FIG. 6 is a diagram illustrating aspects of multiple-input multiple-output (MIMO) communication in accordance with some aspects of the disclosure.

FIG. 6 is a diagram 600 illustrating aspects of MIMO communication in accordance with some aspects of the disclosure. Diagram 600 includes an unprecoded example 600*a* and a precoded example 600*b*. Examples 600*a* and 600*b* include a multi-antenna network entity 302 (e.g., as an example of a source device) in communication with a multi-antenna UE 304 (e.g., as an example of a target and/or destination device). The multi-antenna network entity 302, in some aspects, may include a first antenna 611 ($Tx^1$) and may include a second antenna 612 ($Tx^2$) and the multi-antenna UE 304 may include a first antenna 631 ($Rx^1$) and may include a second antenna 632 ($Rx^2$). In example 600*a*, the multi-antenna network entity 302, in some aspects, transmits a signal x including a DMRS (e.g., $x_{dmrs}$) that may include a first DMRS component (e.g., $$x_{dmrs}^1,$$

not illustrated) transmitted from the first antenna 611 and a second DMRS component (e.g., $$x_{dmrs}^2,$$

not illustrated) transmitted from the second antenna 612. In example 600*a*, the first DMRS component and the second DMRS component are unprecoded.

The transmitted DMRS (and associated data) may experience a channel represented as a matrix H (based on component channels $h_{1,1}$ 621, $h_{1,2}$ 622, $h_{2,1}$ 623, and $h_{2,2}$ 624) representing an effect, such as attenuation and/or phase shift, associated with propagation from the multi-antenna network entity 302 to the multi-antenna UE 304. Based on the channel, the multi-antenna UE 304 may receive a signal y=Hx+n including a first component (e.g., $y_1$) received at the first antenna 631 and a second component (e.g., $y_2$) received at the second antenna 632, as well as a noise component n. In some aspects of (narrowband) MIMO communication, precoding may be defined for a PRB group (PRG) including a plurality of PRBs (e.g., two or four PRBs). A pre-coding may be different across different PRGs and may not be known to the multi-antenna UE 304.

In example 600*a*, for 2×2 MIMO, the transmitted signal may be represented by a vector of size 2 ($x_{dmrs} \in \mathbb{C}^{N_{tx} \times 1}$) and the channel may be represented by a vector of size 2×2 ($H \in \mathbb{C}^{N_{rx} \times N_{tx}}$). The multi-antenna UE 304 may estimate a channel $$\hat{H} = y x_{dmrs}^H$$

based on the DMRS of the received signal y. As used herein, Ĥ refers to a channel estimate derived from a set of reference signals such as a set of DMRSs.

In example 600*b*, the transmitted signal may be pre-coded using a pre-coding matrix 640, ν, such that the transmitted signal is νx and a first DMRS component (e.g., $$v x_{dmrs}^1,$$

denoted $x'_1$) is transmitted from the first antenna 611 and a second DMRS component (e.g., $$v x_{dmrs}^2,$$

denoted $x'_2$) is transmitted from the second antenna 612 after (or based on) the pre-coding. The precoder weights phase and magnitude of the first antenna 611 and the second antenna 612. The pre-coding matrix, in some aspects, may be associated with a beam forming from the transmit antennas to the receive antennas. Based on the channel as subject to the precoding, the multi-antenna UE 304 may receive a signal y'=Hνx'+n including a first component (e.g., $y'_1$) received at the first antenna 631 and second component (e.g., $y'_2$) received at the second antenna 632. In example 600*b*, $x_{dmrs} \in \mathbb{C}^{N_{tx} \times 1}$, $v \in O(N_{tx})$, $H \in \mathbb{C}^{N_{rx} \times N_{tx}}$.

In example 600*b*, the precoder is typically not known to the UE 304. Thus, the UE 304 may estimate the channel H as a precoded channel: $H^{eff}=Hv$. Thus, $y=Hvx_{dmrs}+n=H^{eff}x_{dmrs}+n$. Furthermore, $H^{eff}$ may include component channels $h'_{11}$, $h'_{12}$, $h'_{21}$, and $h'_{22}$. In this case, the UE may estimate $$\hat{H}^{eff} = y' x_{dmrs}^H.$$

Figure 7:
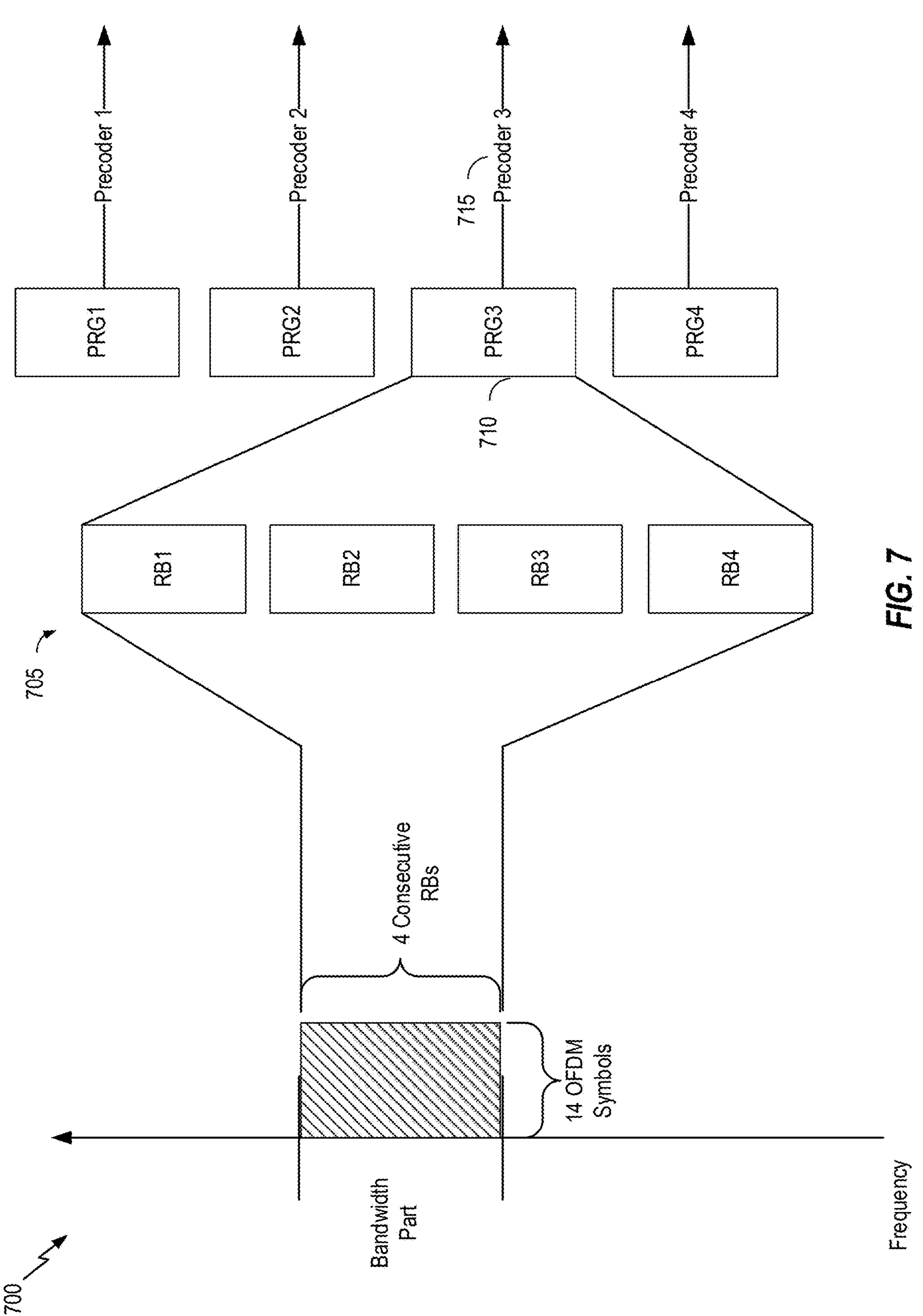
FIG. 7 is a diagram illustrating an example of PRB groups (PRGs), also referred to as PRB bundling.

FIG. 7 is a diagram illustrating an example 700 of PRGs, also referred to as PRB bundling. Example 700 includes a bandwidth part (BWP) configured for a UE (e.g., UE 104, UE 304). The bandwidth part includes 4 consecutive RBs 705: RB1, RB2, RB3, and RB4. The 4 RBs 705 are grouped into a PRG 710. For example, a bundle size parameter may indicate a number of consecutive or contiguous RBs 705 that can be group into a PRG.

A precoder 715 may be applied for the PRG 710. For example, a unique precoding matrix may be applied per PRG bundle:

$$y^{prg} = H_{raw}^{prg} v^{prg} x^{prg} + n^{prg}.$$

Thus, different PRGs can have different precoders, as illustrated in FIG. 7. Furthermore, these different precoders are typically not known to the UE. Thus, the UE may experience an effective channel, at a given PRG, of $$H_{eff}^{prg} = H^{prg} v^{prg} \approx y_i^{prg} (x_i^{prg})^H.$$

In this case, the unique precoding of channels per PRG inhibits smooth interpolation of the channel between PRGs. Aspects described herein provide determination of a precoding misalignment between precoders of different PRGs, such that this precoding misalignment can be used as a reference point in channel estimation.

Figure 8:
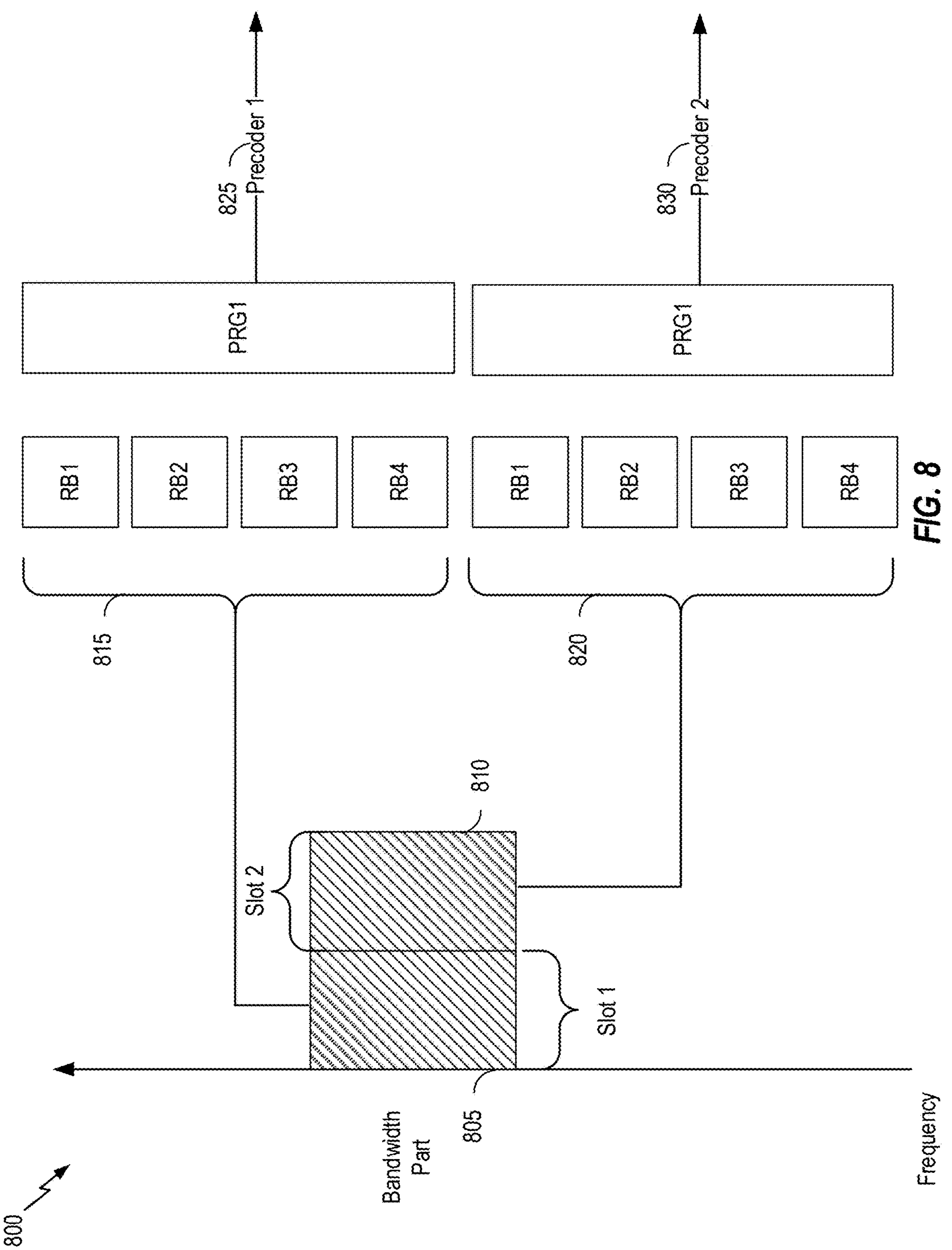
FIG. 8 is a diagram illustrating an example of PRGs in two consecutive slots.

FIG. 8 is a diagram illustrating an example 800 of PRGs in two consecutive slots. Example 800 includes a BWP configured for a UE (e.g., UE 104, UE 304). The bandwidth part includes 4 consecutive RBs: RB1, RB2, RB3, and RB4. The 4 RBs are grouped into a PRG designated PRG1. A first slot 805 and a second slot 810 are illustrated. The RBs and PRG1 in the first slot 805 are illustrated at 815 (indicated by a line connecting the first slot 805 and the brace indicating PRG1), and the RBs and PRG1 in the second slot 810 are illustrated at 820 (indicated by a line connecting the second slot 810 and the brace indicating PRG2). In some aspects, the first slot 805 and the second slot 810 are contiguous (e.g., the first slot 805 is adjacent to the second slot 810 in time).

As shown by reference number 825, a first precoder ("Precoder 1") is applied for the PRG1 in the first slot 805. As shown by reference number 830, a second precoder ("Precoder 2") is applied for the PRG1 in the second slot 810. The precoder change across slots can be random. Thus, as described with regard to FIG. 7, the UE may experience an effective channel, in a PRG and per slot, of $$y^{prg} = H_{raw}^{prg} v^{prg} x^{prg} + n^{prg}.$$

It should be noted that, as used herein, referring to "different PRGs" can refer to two different PRGs that occur at the same time (as illustrated in example 700), two different PRGs that occur at different times, or the same PRG occurring at different times (as illustrated in example 800).

A receiving wireless communication device such as a UE may perform channel estimation on a received channel (y). For example, the wireless communication device may perform the channel estimation on the received channel with regard to a PRG ($y^{prg}$). The wireless communication device may perform the channel estimation by measuring (e.g., extracting) a tone at one or more DMRSs and deriving an estimated channel from the tone:

$$\hat{h}_{i,j} = y_{i,j} x_{i,j}^*.$$

One technique for channel estimation is adaptive minimum mean squared error channel estimation (AMMSE). In AMMSE, the wireless communication device first performs DMRS tone extraction $$(\hat{h}_{i,j} = y_{i,j} x_{i,j}^*).$$

The wireless communication device then performs minimum mean squared error (MMSE) windowing, also referred to as "MMSE tone approximation":

$$\begin{pmatrix} h_1 \\ \vdots \\ h_N \end{pmatrix} = R_{hx} R_{xx}^{-1} \begin{pmatrix} \hat{h}_1 \\ \vdots \\ \hat{h}_N \end{pmatrix},$$

wherein $$R_{xx} = R_{hh} + \sigma_{snr}^2 I \text{ and } R_{hx} = R_{hh}.$$

The wireless communication device then performs MMSE-based frequency-domain interpolation and MMSE-based time-domain interpolation.

$R_{xx}$ is the spatial auto-correlation matrix for channel observations at DMRS location, which may represent an expectation or mean of the DMRS channel auto-correlation matrix B times the conjugate transpose of B, where B represents a vector of channel observations at DMRS REs. $R_{hh}$ is the spatial auto-correlation of the channels over the entire 2D resource grid, in frequency and time. $R_{hx}$ is the cross-correlation matrix between channel at the all the RE locations with the channels at the DMRS location, which may represent an expected or mean value of H (the channel over all the REs collected in a vector form) matrix multiplied with the conjugate transpose of the channel at DMRS REs.

Another technique for channel estimation is cross-slot AMMSE. In cross-slot AMMSE, the wireless communication device first detects if a precoder has changed from a first slot (in which the wireless communication device performed AMMSE according to the technique described above) to a second slot. If a precoder change is detected, the wireless communication device performs per-slot AMMSE as described above. If no precoder change is detected, the wireless communication device may load a DMRS from the first slot $$(\hat{h}_{i,j} = y_{i,j} x_{i,j}^*)$$

into a buffer, and may use the DMRS to linearly extrapolate a channel of the second slot. Generally, as used herein, a variable with a cap (e.g., $\hat{h}_{i,j}$) represents an estimated value of the variable (here, h) based on an observation (here, y).

AMMSE and cross-slot AMMSE present certain challenges with regard to channel estimation where a precoder changes between slots or between PRGs. For example, AMMSE may use knowledge of second-order channel statistics and noise variance, involves high computational expense, and has low estimation error under appropriate conditions. However, for practicality, binning-based strategies are used (i.e., based on estimated channel parameters, like Doppler, delay spread, etc.), and LMMSE parameters of the resulting bin are chosen for channel estimation. Thus, AMMSE may not model correlations across different PRGs and different slots. Cross-slot AMMSE may implement a precoder change detector to detect whether precoder has changed from previous to the current slot. If a precoder change is detected, cross-slot AMMSE falls back to per-slot AMMSE. If no precoder change is detected, the DMRS from previous slot is used from the buffer to perform cross-slot AMMSE (i.e., the DMRS from the previous slot is used to during interpolation and extrapolation). Thus, cross-slot AMMSE is only able to model cross-slot correlation in case of no precoder change, and cross-slot AMMSE does not model correlation across consecutive slots in the case of precoder change.

Aspects described herein provide a framework for modeling correlation between PRGs (whether in the same time resource or different time resources) that are transmitted with different precoders. Channel estimation using this framework is resilient across different precoding strategies, DMRS patterns, signal-to-noise ratios (SNRs), subcarrier spacings, MIMO configurations, and so on. Furthermore, techniques described herein are implementable in a hardware-friendly fashion, thus reducing processing burden and latency associated with channel estimation (particularly taking into account correlation across PRBs). For example, aspects described herein provide inter-PRG and cross-slot channel estimation across different precoders without explicit information regarding precoder change across PRBs and slots, and that can be implemented without disrupting a channel estimation and demapping pipeline.

This framework may be beneficial in a variety of use cases, including channel estimation for resource-grid-based (e.g., slot-based) wireless MIMO systems, 5G NR channel estimation with a varying per-slot precoder, a varying per-PRG precoder within a slot, varying DMRS patterns, varying RB numbers, varying numbers of layers, etc., super-resolution determination, signal recovery based on sparse observations, multi-reference alignment problems, and so on. This framework also provides flexibility for scheduling patterns when calibrating channel estimation performance.

Figure 9:
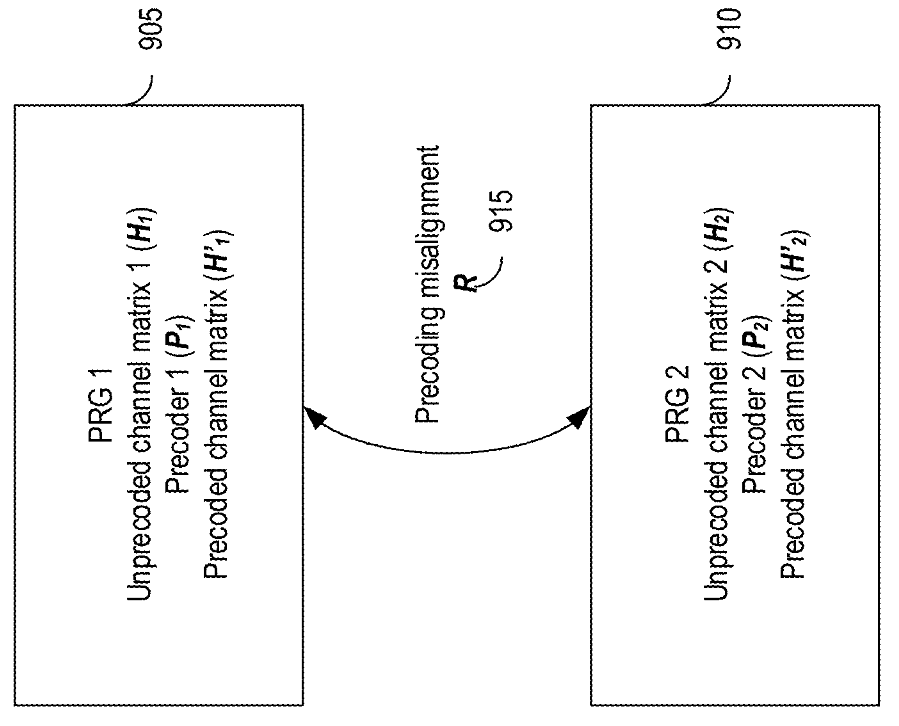
FIG. 9 is a diagram illustrating an example of a first PRG and a second PRG.

FIG. 9 is a diagram illustrating an example 900 of a first PRG 905 and a second PRG 910. In some aspects, the first PRG 905 and the second PRG 910 overlap one another in time (e.g., occur in a same slot, as in FIG. 7). In some aspects, the first PRG 905 and the second PRG 910 do not overlap one another in time (e.g., occur in different slots). For example, the first PRG 905 and the second PRG 910 may be a same PRG in different (e.g., contiguous) slots, as in FIG. 8. As shown, the first PRG 905 is transmitted with a first precoder $P_1$ and the second PRG 910 is transmitted with a second precoder $P_2$ which is different than the first precoder $P_1$. Without precoding, a channel matrix of the first PRG 905 may be denoted $H_1$. With recoding (as in FIG. 9), the channel matrix of the first PRG 905 may be denoted $H'_1$ or $$H_1^{eff},$$

and the channel matrix of the second PRG 910 may be denoted $H'_2$ or $$H_2^{eff}.$$

The first PRG 905 and the second PRG 910 may be considered neighboring PRG blocks.

Notation is now introduced to describe the determination of a precoding misalignment R (shown by reference number 915), and how this precoding misalignment R is used to perform channel estimation for the first PRG 905 and the second PRG 910.

A PRG, out of the first PRG 905 and the second PRG 910, may be denoted by an index i (e.g., 1 for the first PRG 905 and 2 for the second PRG 910). An RE of a PRG may be denoted by indexes f (for subcarriers) and t (for symbols). Thus the channel model for the first PRG 905 and the second PRG 910 can be defined as $$y_i^{f,t} = H_i^{f,t} P_i x_i^{f,t} + Z_i^{f,t}$$

for $i \in \{1, 2\}$, where Z represents a noise (e.g., n). The PRGs 905, 910 are transmitted in MIMO, where d represents a MIMO dimension and is equal to $N_{rx}$ (e.g., a number of receivers) and $N_{rx}$ (e.g., a number of transmitters). Thus, $H_i$, which is the unprecoded channel matrix, belongs to the set defined by the cumulative frequency and time resources of the PRGs 905, 910 and the MIMO dimension: $H_i \in \mathbb{C}^{F \times T \times d \times d}$. For a given PRG and frequency/time resource, $$H_i^{f,t} \in \mathbb{C}^{d \times d}.$$

In some aspects described herein, $P_i$ is defined as a d-dimensional unitary complex matrix: $P_i \in U(d)$, where $PP^H = P^H P = I$, where in this context, H denotes a conjugate transpose operation and I is the identity matrix.

Aspects described herein provide estimation of a channel matrix $H_i' = H_i P_i$ from a set of DMRSs $$\{x_i^p, y_i^p\}_p.$$

For example, this estimate may be based on an estimated channel B, which is defined to be equal to the channel as measured at DMRSs: $B := \hat{H}_{dmrs}$ according to $$\{x_i^p, y_i^p\}_p.$$

In traditional MMSE and within a PRG, assuming a zero mean, the wireless communication device may compute covariance matrices $\Sigma_{BB}$ and $\Sigma_{HB}$, and may interpolate via MMSE to identify $$H'_{MMSE} = \sum_{HB} \sum_{BB}^{-1} B.$$

As used herein, B denotes an estimated channel at the DMRS REs based on observations at the DMRS REs. For example, B may represent a noise-compensated MMSE channel at the DMRS REs based on DMRS observations.

Aspects described herein provide determination of a precoding misalignment R, indicated at 915, which indicates a difference between $P_1$ and $$P_2 \colon P_2^{-1} P_1 = R.$$

This may be beneficial because it can expected that there is no correlation between $$H_1'$$

and $$H_2'$$

due to precoding $P_i \in U(d)$, but there is correlation between $H_1$ and $H_2$, or between $$H_1'$$

and $$H_2'R.$$

This correlation can be exploited to improve channel estimation performance.

FIG. 10 provides an example 1000 of channel estimation using the precoding misalignment. For example, aspects provided herein provide a two-stage process, including a synchronization stage 1005 (also referred to as an alignment estimation stage) in which R is derived from a DMRS measurement 1015, and a channel estimation stage 1010 in which R is used to perform channel estimation. In the synchronization stage 1005, R is estimated from $B_1$ and $B_2$, referred to as estimating alignment 1020, where $B_i := \hat{H}_{dmrs,i}$. As illustrated, a precoding misalignment 1025, $$P_2^{-1}P_1,$$

representing R, can be derived from $B_1$ and $B_2$ as described below. $B_1$ and $B_2$ are referred to as channel estimations. This precoding misalignment 1025 can be used to derive R, such as by deriving a value 1030 of $\hat{R}_{MLE}$ as via maximum likelihood estimation (MLE), in which the value 1030 is derived by maximizing a probability of the precoding misalignment given $B_1$ and $B_2$, as described below. Then, inter-PRG MMSE is performed in the channel estimation stage 1010, in which $$(H_1', H_2'R)$$

is estimated from $(B_1, B_2R)$ using AMMSE 1040 (which provides a larger number of features for estimation than per-PRG estimation without incorporating R). Finally, realignment is performed at aligned channel estimation 1045 to correct $$H_2'R$$

with R to compute $$H_2'$$

at final channel estimation 1050. The determination of $$H_1'$$

is referred to herein as estimating a first channel for a first transmission (e.g., first PRG 905). The determination of $$H_2'$$

is referred to herein as estimating a second channel for a second transmission (e.g., second PRG 910).

To compute the precoding misalignment 1025 or the value 1030 in a probabilistic fashion, a posterior probability over channels $$H_1', H_2'$$

can be obtained by marginalizing over R:

$$P(H_1', H_2' \mid B_1, B_2) = \int_{R \in U(d)} P(H_1', H_2' \mid B_1, B_2, R) P(R \mid B_1, B_2) dR$$

With an assumption that the term $P(R|B_1, B_2)$ is approximately a delta function (which is aligned with observations and practice), $P(R|B_1, B_2) \approx \delta_{R=\hat{R}_{MLE}}$, the value 1030 of $\hat{R}_{MLE}$ can be determined as:

$$\hat{R}_{MLE} = \text{argmax}_R P(R \mid B_1, B_2)$$

and inter-PRG MMSE can be performed based on:

$$P(H_1', H_2' \mid B_1, B_2) \approx P\left(H_1', H_2'\hat{R}_{MLE} \,\middle|\, B_1, B_2\hat{R}_{MLE}\right)$$

$\hat{R}_{MLE}$ may represent the value of R (the precoding misalignment 1025 or the value 1030) that maximizes the joint probability of observations of aligned reference signals in both the PRGs for cross-PRG channel estimation and slots for cross-slot channel estimation. For example, $\hat{R}_{MLE}$ may represent the value of R that maximizes P(H1, H2*R), where P(H1, H2*R) represents joint distribution of channel on reference locations (DMRS) in a first PRG and aligned channel on reference locations (DMRS) in a second PRG.

Continuing the above example, the value 1030 of $\hat{R}_{MLE}$ can be determined based on a posterior probability where the precoding misalignment 1025 is treated as a relative rotation. For example, an MLE estimate of R can be obtained based on an assumption and using certain covariance matrixes:

$$P(B_1, B_2R) = \mathcal{N}\left(B_1, B_2R \mid 0, \begin{bmatrix} \sum_1 & \sum_{21}^H \\ \sum_{21} & \sum_2 \end{bmatrix}\right)$$

Here, a mean of zero is assumed, and a generic covariance matrix is assumed. The posterior probability over the relative rotation (that is, precoding misalignment 1025) is given by $P(R|B_1, B_2) \propto P(B_2R|B_1) = \mathcal{N}(B_2R|\hat{\mu}(B_1), \hat{\Sigma})$, where $$\hat{\mu}(B_1) = \sum_{21} \sum_{1}^{-1} B_1$$

and $$\hat{\sum} = \sum_{2} - \sum_{21} \sum_{1}^{-1} \sum_{21}^{H}.$$

Finally, an MLE estimate of the value 1030 of R ($\hat{R}_{MLE}$) can IDC be determined as:

$$\hat{R}_{MLE} = \text{argmin}_R P(B_2R \mid B_1) = \text{argmin}_R \left| B_2R - \hat{\sum}^{-1} \hat{\mu}(B_1) \right|$$

In the above formulas, $B_1$ and $B_2$ can be estimated from DMRSs in the first PRG 905 and the second PRG 910. Covariance matrixes $\Sigma_1$, $\Sigma_2$ and $\Sigma_{12}$ can be computed using $B_1$ and $B_2$. For example, $\Sigma_1$, $\Sigma_2$ and $\Sigma_{12}$ may be computed empirically or analytically. Analytical computation may be performed using power delay profiles of the channel (such as a uniform power delay profile or an exponential power delay profile). In some aspects, covariance matrices ($\Sigma_{21}$, $\Sigma_{11}$) are determined based on a power delay profile of the first PRG 905 or the second PRG 910. In some aspects, covariance matrices ($\Sigma_{21}$, $\Sigma_{11}$) are computed empirically. $\hat{\mu}(B_1)$ and $\hat{\Sigma}$ are computed as shown above using the covariance matrixes, $B_1$, and $B_2$. Finally, $\hat{R}_{MLE}$ can be obtained via singular value decomposition (SVD):

$$R' = B_2^H \hat{\sum}^{-1} \hat{\mu}(B_1) \in \mathbb{C}^{d \times d}$$

$$U, L, V = SVD(R')$$

$$\hat{R}_{MLE} = UV^H$$

After obtaining the value 1030 of $\hat{R}_{MLE}$, the wireless communication device proceeds to the channel estimation stage 1010. The wireless communication device may align DMRS measurements at 1035, for example, by combining $B_2$ and the value 1030 of $\hat{R}_{MLE}$ at 1037.

At 1040, the wireless communication device performs AMMSE using the aligned DMRS measurements. By performing the AMMSE using the aligned DMRS measurements (and therefore using the value 1030 as an input to the AMMSE), the wireless communication device improves performance of channel estimation relative to performing AMMSE using only the respective DMRS measurements without taking into account the precoding misalignment 1025. The AMMSE outputs a first estimate $$H_1'$$

of a first channel of the first PRG 905 and a second estimate $$H_2' \hat{R}_{MLE}$$

of a second channel of the second PRG 910. This is illustrated at 1045 as aligned channel estimation.

At 1050, the wireless communication device determines a final channel estimation based on the aligned channel estimation. For example, the wireless communication device uses an inverse of the value 1030 of $\hat{R}_{MLE}$ to derive $$H_2',$$

thereby providing a second estimate $$H_2'$$

of the second channel of the second PRG 910 absent the precoding misalignment 1025.

The first PRG 905 includes a first plurality of DMRSs (not illustrated). The second PRG 910 includes a second plurality of DMRSs (also not illustrated). In some aspects, the channel estimation described with regard to FIG. 10 uses all of the first plurality of DMRSs and the second plurality of DMRSs (e.g., for determination of $B_1$ and $B_2$, calculation of covariance matrices, or the like), which improves accuracy of these calculations. In some other aspects, the channel estimation uses a proper subset of the first plurality of DMRSs and/or the second plurality of DMRSs. For example, the channel estimation may use a first subset of the first plurality, wherein the first subset includes DMRSs of the first plurality that are located closest to the second PRG 910 in frequency. Additionally, or alternatively, the channel estimation may use a second subset of the second plurality, wherein the second subset includes DMRSs of the second plurality that are located closest to the first PRG 905 in frequency. As another example, when the first PRG 905 occurs earlier in time than the second PRG 910, the channel estimation may use a first subset of the first plurality that includes DMRSs of the first plurality that are located closest to the second PRG 910 in time. Additionally, or alternatively, the channel estimation may use a second subset of the second plurality, wherein the second subset includes DMRSs of the second plurality that are located closest to the first PRG 905 in time. Once B1 and B2 are estimated, $B_1$ and $B_2$ may be used to estimate $R_{MLE}$. Then, all the DMRS REs can be used to jointly estimate the channel across both the PRGs. Thus, efficiency of channel estimation is improved by using only DMRSs that are associated with a highest correlation between PRGs.

Examples 900 and 1000 are described with regard to two PRGs and a precoding misalignment between the two PRGs. The techniques described herein can be applied for more than two PRGs. For example, consider five PRGs. In this case, the wireless communication device may determine multiple precoding misalignments according to the techniques described with regard to FIGS. 9 and 10. The multiple precoding misalignments may include a first precoding misalignment, $R_{12}$, between the first PRG and the second PRG, a second precoding misalignment, $R_{23}$, between the second PRG and the third PRG, a third precoding misalignment, $R_{34}$, between the third PRG and the fourth PRG, and a fourth precoding misalignment, $R_{45}$, between the fourth PRG and the fifth PRG. These precoding misalignments can be used, along with respective estimated channels $B_1$, $B_2$, $B_3$, $B_4$, and $B_5$, for the five PRGs, to perform channel estimation and derive H. For example, to derive an estimate $\hat{H}'_3$ of the channel spanning the second, third, and fourth PRG, the wireless communication device may use $B_2\hat{R}_{23}$, $B_3$, and $B_4\hat{R}^{-1}_{34}$ to perform MMSE and determine the estimate $\hat{H}'_3$. This approach can be used to determine overlapping channel estimates, such as $\hat{H}'_2$ for the channel spanning the first, second, and third PRGs and/or $\hat{H}'_4$ for the channel spanning the third, fourth, and fifth PRGs. Thus, the channel estimation can span larger groups of PRGs, improving the accuracy of channel estimation and enabling processing of PRG groups.

Figure 11:
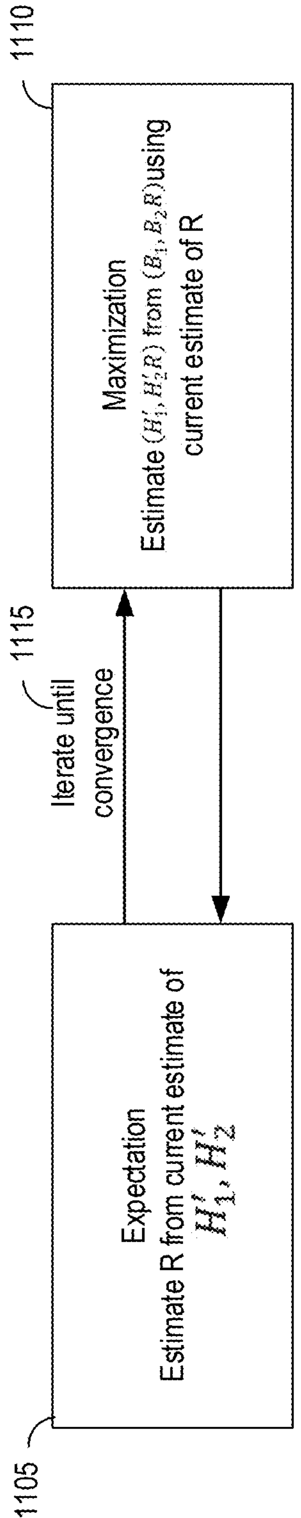
FIG. 11 is a diagram illustrating an example of an iterative approach for channel estimation

FIG. 11 is a diagram illustrating an example 1100 of an iterative approach for channel estimation using techniques described with regard to FIGS. 9 and 10. Example 1100 includes an expectation block 1105 and a maximization block 1110. Thus, the iterative approach in example 1100 is an expectation-maximization (E-M) approach.

In the expectation block 1105, current parameter estimates are used to create a function that calculates an expected value of a log-likelihood, treating the latent variables as observed. For example, and generally speaking, an expectation block 1105 involves the creation of $Q(\theta|\theta^{(t)})=E[\log L(\theta; X, Z)|X, \theta^{(t)}]$ where X is observed data, Z represents the latent variables, and $\theta^{(t)}$ is the current parameter estimate. In the context of channel estimation, R is estimated from a current estimate of $$H'_1, H'_2.$$

For example, $$q^t(R) = P\left(R \,\middle|\, H'^t\right) \propto \mathcal{N}\left(H_1'^t \,\middle|\, \hat{\mu}_{H'}\left(H_2'^t R\right), \hat{\Sigma}_{H'}\right).$$

In the maximation block 1110, parameters are found that maximize the expected log-likelihood: $\theta_{(t+1)}=\arg\max Q(\theta|\theta^{(t)})$. In the context of channel estimation, $$(H'_1, H'_2R)$$

is estimated from $(B_1, B_2R)$ using a current estimate of R. More particularly, $$H'^{t+1} = \mathrm{argmax}_{H'}\mathbb{E}_{R\sim q^t}\left[\log\mathcal{N}\left(H'_1, H'_2R \,|\, \hat{\mu}_{H'B}(B_1, B_2R), \hat{\Sigma}_{H'B}\right)\right].$$

At 1115, the wireless communication device may iterate through the expectation block 1105 and the maximization block 1110 until convergence (e.g., until a local optimum is reached).

The iterative approach can also be implemented as a maximization-maximization process. In a maximization-maximization process, the expectation block 1105 includes determination of $$R^t = \mathrm{argmin}_R\left|H_1'^t - \hat{\Sigma}_{H'}^{-1}\hat{\mu}_{H'}\left(H_2'^t R\right)\right|,$$

and the maximization block 1110 involves determination of $H^{t+1}=\hat{\mu}_{H'B}(B_1, B_2R^t)$ and $$H'^{t+1} = \left(H_1'^{t+1}, H_2'^{t+1}R^t\right),$$

with iteration at 1115 until convergence.

Thus, the wireless communication device may determine a first initial channel estimation (a first value of $$H'_1)$$

and a second initial channel estimation (a first value of $$H'_2$$

or $$H'_2R),$$

initial channel estimation. The wireless communication device may then determine $(B_1, B_2R)$ using the determined value of R, and may estimate second values of $$(H'_1, H'_2R)$$

from $(B_1, B_2R)$. With these second values of $$(H'_1, H'_2R),$$

the wireless communication device may update R. This may continue in an iterative fashion until a local optimization is reached.

Figure 12:
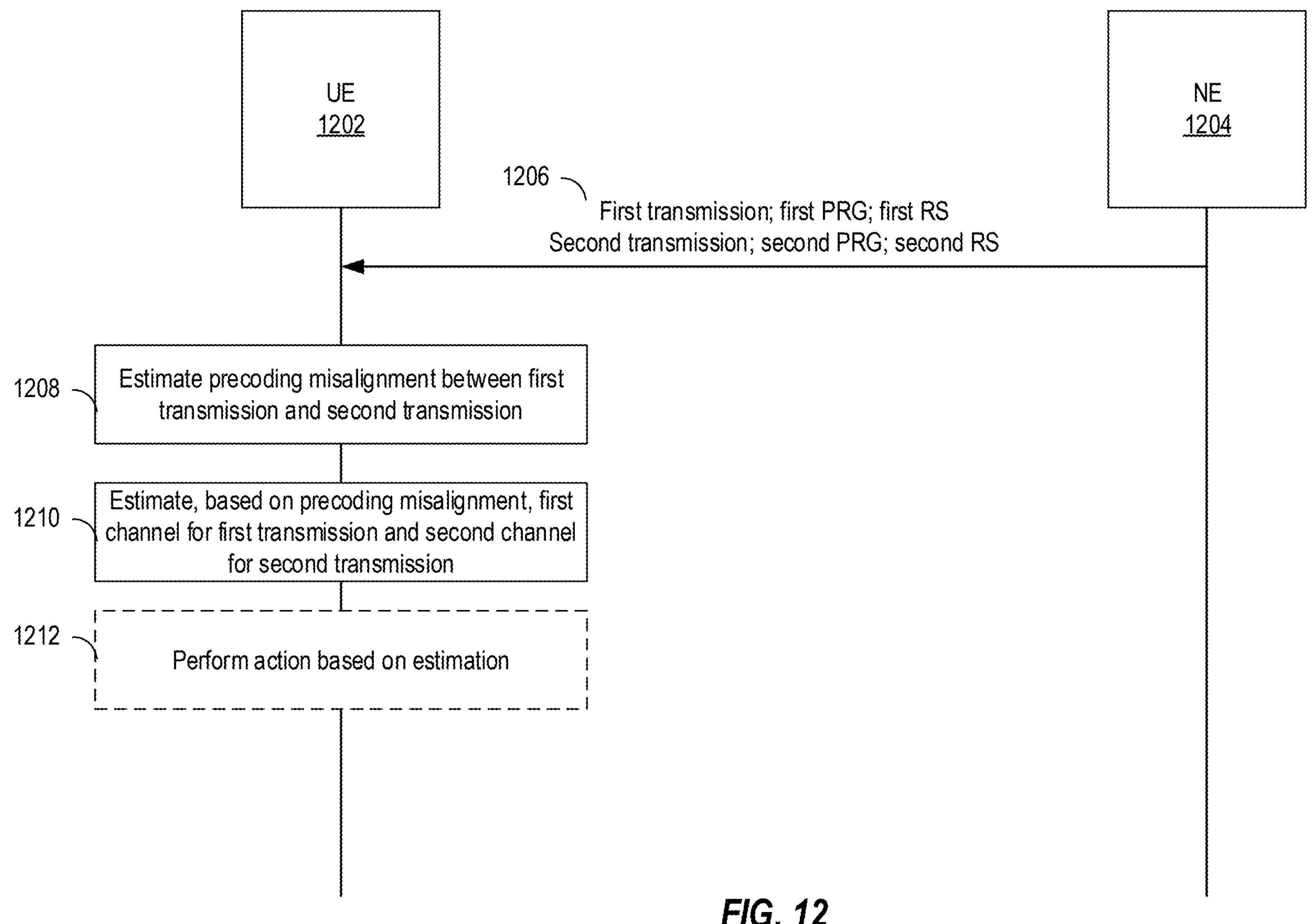
FIG. 12 is a diagram illustrating an example of signaling for multi-reference channel estimation.

FIG. 12 is a diagram illustrating an example 1200 of signaling for multi-reference channel estimation. In some aspects, the network entity 1202 may be an example of the BS 102 depicted and described with respect to FIG. 1, the first network entity 300 or the second network entity 302 depicted and described with respect to FIG. 3, or a disaggregated base station depicted and described with respect to FIG. 2. Similarly, the UE 1204 may be an example of UE 104 depicted and described with respect to FIG. 1 or the UE 304 depicted and described with respect to FIG. 3. However, in other aspects, UE 1204 may be another type of wireless communications device and network entity 1202 may be another type of network entity or network node, such as those described herein. Note that any operations or signaling illustrated with dashed lines may indicate that that operation or signaling is an optional or alternative example.

As shown, at 1206, the network entity 1202 may transmit, and the UE 1204 may receive, a first transmission and a second transmission. In some aspects, the first transmission may be a first PRG 905 and the second transmission may be a second PRG 910. In some aspects, the first transmission and the second transmission overlap one another in time. In some other aspects, the first transmission and the second transmission are non-overlapped with one another. For example, the first transmission and the second transmission may occupy contiguous time slots.

As shown, at 1208, the UE 1204 estimates a precoding misalignment (such as R or $\hat{R}_{MLE}$) between the first transmission and the second transmission. For example, the UE may estimate the precoding misalignment according to operations described with regard to FIGS. 9-11.

As shown, at 1210, the UE 1204 estimates a first channel $$(H_1')$$

for the first transmission and a second channel $$(H_2')$$

for the second transmission. The UE 1204 may perform this estimation according to operations described with regard to FIGS. 9-11. In some aspects, the UE 1204 may first perform this estimation for PRGs that are contiguous in frequency, and then may perform this estimation for slots that are contiguous in time.

As shown, at 1212, the UE 1204 optionally performs an action based on the estimation of the first channel and/or the second channel. For example, the UE 1204 may generate and transmit channel state information based on the estimation of the first channel and/or the second channel. As another example, the UE 1204 may schedule a communication based on the estimation of the first channel and/or the second channel. As another example, the UE 1204 may select a precoder based on the estimation of the first channel and/or the second channel. As another example, the UE 1204 may select a communication parameter, such as a modulation and coding scheme, a number of layers, a rank, or the like, based on the estimation of the first channel and/or the second channel.

Figure 13:
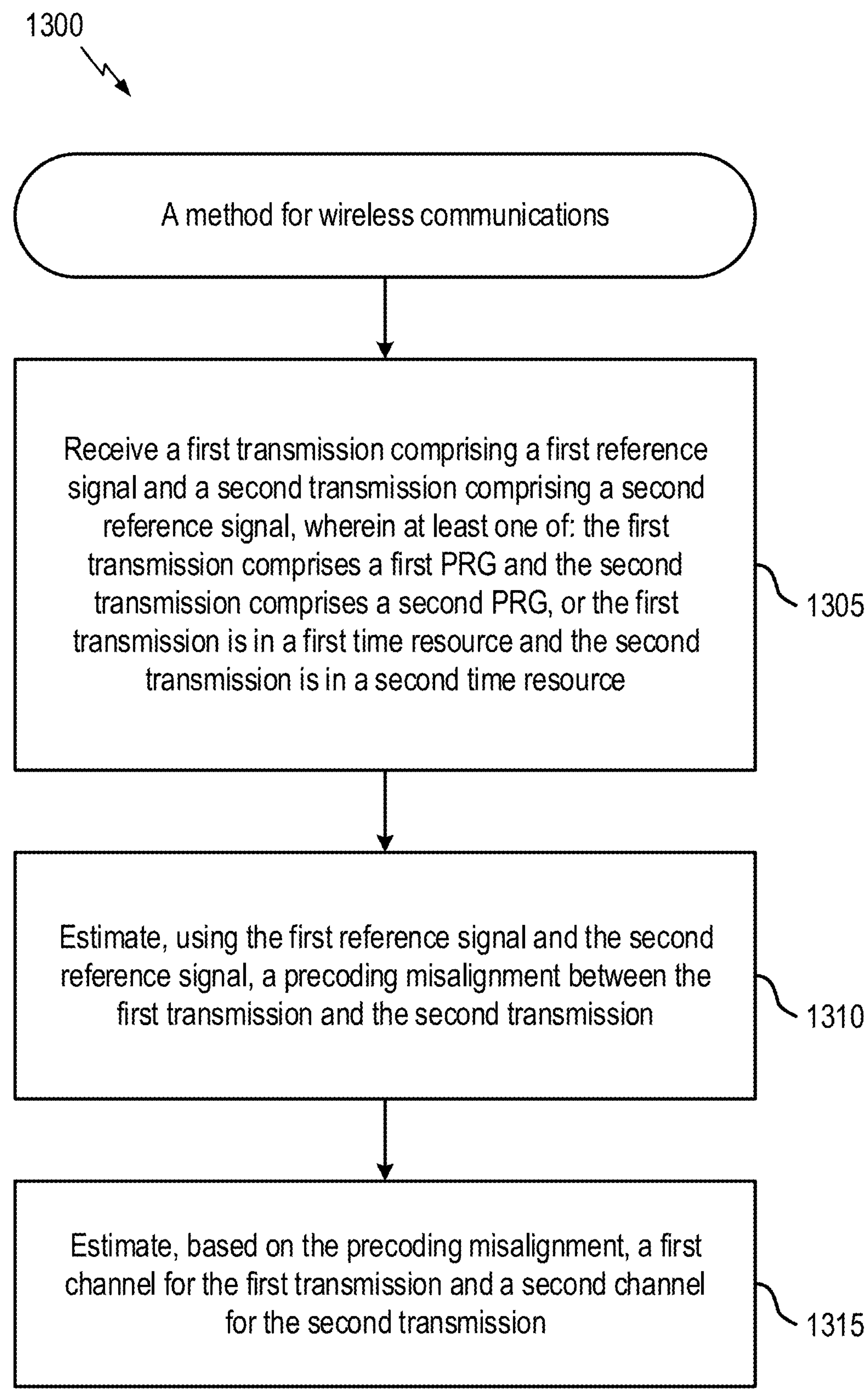
FIG. 13 depicts a method for wireless communications.

FIG. 13 shows a method 1300 for wireless communications by an apparatus, such as UE 104 of FIG. 1 or UE 304 of FIG. 3 (though the operations of method 1300 can be performed by another wireless communication device such as network entity 302).

Method 1300 begins at block 1305 with receiving a first transmission (first PRG 905) comprising a first reference signal (a first one or more DMRSs) and a second transmission (second PRG 910) comprising a second reference signal (a second one or more DMRSs), wherein at least one of: the first transmission comprises a first PRG and the second transmission comprises a second PRG, or the first transmission is in a first time resource and the second transmission is in a second time resource (as illustrated in FIG. 8).

Method 1300 then proceeds to block 1310 with estimating, using the first reference signal and the second reference signal, a precoding misalignment (such as the precoding misalignment 1025 or the value 1030) between the first transmission and the second transmission.

Method 1300 then proceeds to block 1315 with estimating, based on the precoding misalignment, a first channel $$(H_1')$$

for the first transmission and a second channel $$(H_2')$$

for the second transmission.

In some aspects, the first transmission overlaps the second transmission in time.

In some aspects, the precoding misalignment indicates a difference between a first precoder of the first transmission and a second precoder of the second transmission, wherein the second precoder is different than the first precoder.

In some aspects, the second precoder is unknown to the wireless communications device.

In some aspects, the first precoder is also unknown to the wireless communications device.

In some aspects, block 1310 includes estimating the precoding misalignment based on maximizing a probability of the precoding misalignment given a first channel estimation derived from the first reference signal and a second channel estimation derived from the second reference signal.

In some aspects, block 1315 includes: estimating the first channel using a first channel estimation derived from the first reference signal; and estimating the second channel using the precoding misalignment and a second channel estimation derived from the second reference signal.

In some aspects, estimating the second channel comprises correcting the second channel estimation to remove the precoding misalignment.

In some aspects, the first transmission comprises a first plurality of reference signals, the second transmission comprises a second plurality of reference signals, and estimating the first channel and the second channel is based on a first proper subset of the first plurality of reference signals and a second proper subset of the second plurality of reference signals.

In some aspects, the estimation of the precoding misalignment is based on a first channel estimation within a transmission of the first transmission or the second transmission, and based on a second channel estimation of the second transmission using the first reference signal.

In some aspects, the precoding misalignment is a first precoding misalignment and the method 1300 further comprises: estimating a second precoding misalignment between the second transmission and a third transmission; and estimating a third channel for the third transmission based on the second precoding misalignment.

In some aspects, the estimation of the second channel is further based on the second precoding misalignment.

In some aspects, the precoding misalignment is based on a first initial channel estimation of the first transmission and a second initial channel estimation of the second transmission (as described with regard to FIG. 11).

In some aspects, block 1310 includes iteratively estimating the precoding misalignment.

Figure 14:
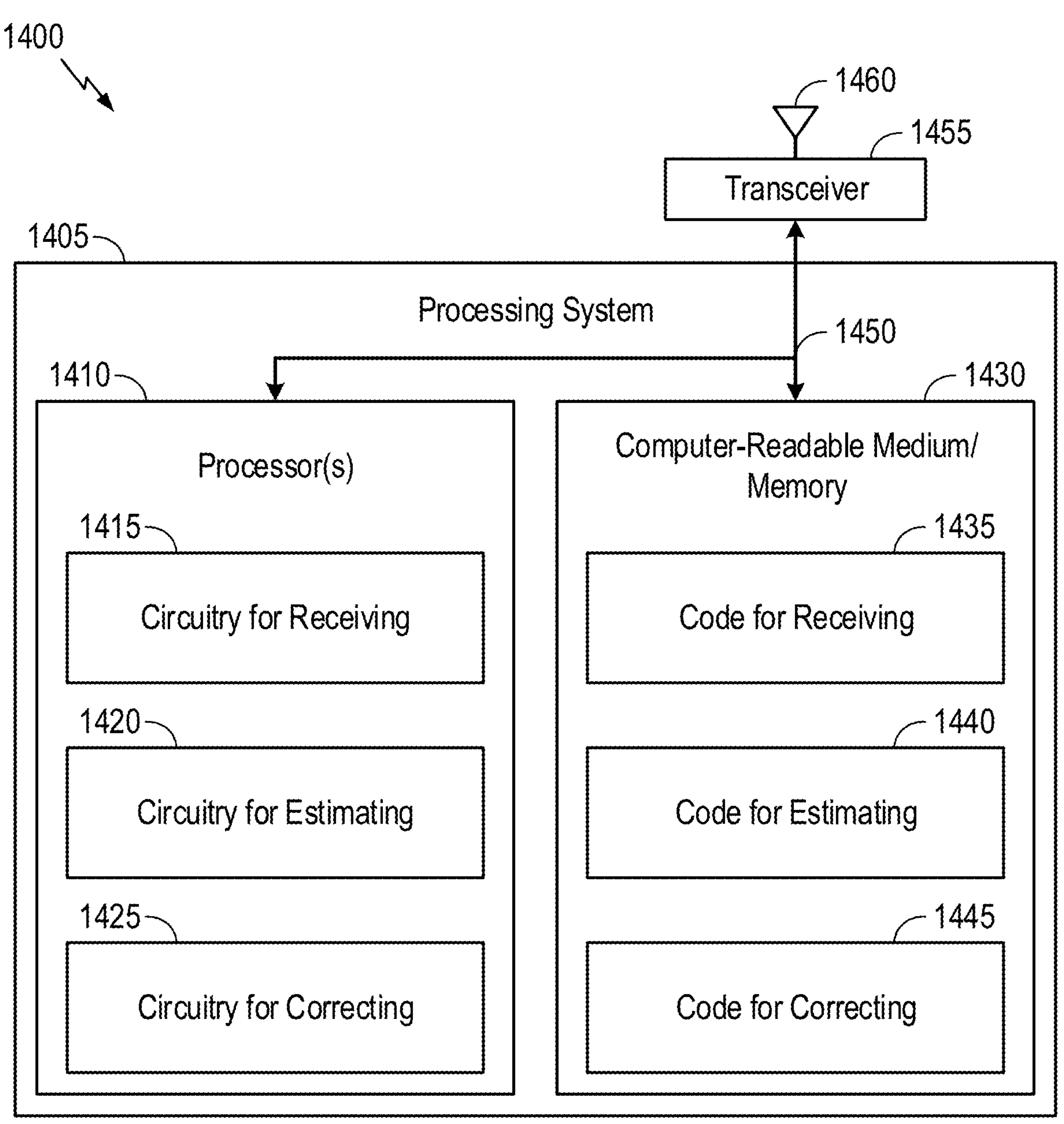
FIG. 14 depicts aspects of an example communications device.

In some aspects, method 1300, or any aspect related to it, may be performed by an apparatus, such as communications device 1400 of FIG. 14, which includes various components operable, configured, or adapted to perform the method 1300. Communications device 1400 is described below in further detail.

Note that FIG. 13 is just one example of a method, and other methods including fewer, additional, or alternative operations are possible consistent with this disclosure.

Example Communications Devices

FIG. 14 depicts aspects of an example communications device 1400 configured for wireless communications. In some aspects, communications device 1400 is a user equipment, such as UE 104 described above with respect to FIG. 1 or UE 304 described with respect to FIG. 3.

The communications device 1400 includes a processing system 1405 coupled to a transceiver 1455 (e.g., a transmitter and/or a receiver). The transceiver 1455 is configured to transmit and receive signals for the communications device 1400 via an antenna 1460, such as the various signals as described herein. The processing system 1405 may be configured to perform processing functions for the communications device 1400, including processing signals received and/or to be transmitted by the communications device 1400.

The processing system 1405 includes one or more processors 1410 and a computer-readable medium/memory 1430. In various aspects, the one or more processors 1410 may be representative of the one or more processors 318 described with respect to FIG. 3. The one or more processors 1410 are coupled to a computer-readable medium/memory 1430 via a bus 1450. In some aspects, the computer-readable medium/memory 1430 may be representative of the one or more memories 320 described with respect to FIG. 3. The computer-readable medium/memory 1430 is a non-transitory computer-readable medium/memory. In certain aspects, the computer-readable medium/memory 1430 is configured to store instructions (e.g., computer-executable code), that when executed by the one or more processors 1410, cause the one or more processors 1410 to perform the method 1300 described with respect to FIG. 13, or any aspect related to it, including any operations described in relation to FIG. 13. Note that reference to a processor performing a function of communications device 1400 may include one or more processors performing that function of communications device 1400, such as in a distributed fashion.

In the depicted example, computer-readable medium/memory 1430 stores code (e.g., executable instructions), including code for receiving 1435, code for estimating 1440, and code for correcting 1445. Processing of the code 1435-1445 may enable and cause the communications device 1400 to perform the method 1300 described with respect to FIG. 13, or any aspect related to it. For example, in some aspects, code for receiving 1435 may include code for receiving a first transmission comprising a first reference signal and a second transmission comprising a second reference signal, wherein at least one of: the first transmission comprises a first PRG and the second transmission comprises a second PRG, or the first transmission is in a first time resource and the second transmission is in a second time resource. In some aspects, code for estimating 1440 may include code for estimating, using the first reference signal and the second reference signal, a precoding misalignment between the first transmission and the second transmission. In some aspects, code for estimating 1440 may include code for estimating, based on the precoding misalignment, a first channel for the first transmission and a second channel for the second transmission.

The one or more processors 1410 include circuitry configured to implement (e.g., execute) the code stored in the computer-readable medium/memory 1430, including circuitry for receiving 1415, circuitry for estimating 1420, and circuitry for correcting 1425. Processing with circuitry 1415-1425 may enable and cause the communications device 1400 to perform the method 1300 described with respect to FIG. 13, or any aspect related to it. For example, in some aspects, circuitry for receiving 1415 may include circuitry for receiving a first transmission comprising a first reference signal and a second transmission comprising a second reference signal, wherein at least one of: the first transmission comprises a first PRG and the second transmission comprises a second PRG, or the first transmission is in a first time resource and the second transmission is in a second time resource. In some aspects, circuitry for estimating 1420 may include circuitry for estimating, using the first reference signal and the second reference signal, a precoding misalignment between the first transmission and the second transmission. In some aspects, circuitry for estimating 1420 may include circuitry for estimating, based on the precoding misalignment, a first channel for the first transmission and a second channel for the second transmission.

More generally, means for communicating, transmitting, sending or outputting for transmission may include the one or more transceivers 324, one or more antenna 322 and/or processing system 316 of the UE 304 illustrated in FIG. 3, transceiver 1455 and/or antenna 1460 of the communications device 1400 in FIG. 14, and/or one or more processors 1410 of the communications device 1400 in FIG. 14. Means for communicating, receiving or obtaining may include the one or more transceivers 324, one or more antennas 322, and/or processing system 316 of the UE 304 illustrated in FIG. 3, transceiver 1455 and/or antenna 1460 of the communications device 1400 in FIG. 14, and/or one or more processors 1410 of the communications device 1400 in FIG. 14.

Example Clauses

Implementation examples are described in the following numbered clauses:

Clause 1: A method for wireless communications by an apparatus comprising: receiving a first transmission comprising a first reference signal and a second transmission comprising a second reference signal, wherein at least one of: the first transmission comprises a first PRG and the second transmission comprises a second PRG, or the first transmission is in a first time resource and the second transmission is in a second time resource; estimating, using the first reference signal and the second reference signal, a precoding misalignment between the first transmission and the second transmission; and estimating, based on the precoding misalignment, a first channel for the first transmission and a second channel for the second transmission.

Clause 2: The method of Clause 1, wherein the first transmission overlaps the second transmission in time.

Clause 3: The method of any one of Clauses 1-2, wherein the precoding misalignment indicates a difference between a first precoder of the first transmission and a second precoder of the second transmission, wherein the second precoder is different than the first precoder.

Clause 4: The method of Clause 3, wherein the second precoder is unknown to the wireless communications device.

Clause 5: The method of Clause 4, wherein the first precoder is also unknown to the wireless communications device.

Clause 6: The method of any one of Clauses 1-5, wherein estimating the precoding misalignment comprises estimating the precoding misalignment based on maximizing a joint probability of observations of aligned reference signals given a first channel estimation derived from the first reference signal and a second channel estimation derived from the second reference signal.

Clause 7: The method of any one of Clauses 1-6, wherein estimating the first channel and the second channel comprises: estimating the first channel using a first channel estimation derived from the first reference signal; and estimating the second channel using the precoding misalignment and a second channel estimation derived from the second reference signal.

Clause 8: The method of Clause 7, wherein estimating the second channel comprises correcting the second channel estimation to remove the precoding misalignment.

Clause 9: The method of any one of Clauses 1-8, wherein the first transmission comprises a first plurality of reference signals, the second transmission comprises a second plurality of reference signals, and estimating the first channel and the second channel is based on a first proper subset of the first plurality of reference signals and a second proper subset of the second plurality of reference signals.

Clause 10: The method of any one of Clauses 1-9, wherein the estimation of the precoding misalignment is based on a first channel estimation within a transmission of the first transmission or the second transmission, and based on a second channel estimation of the second transmission using the first reference signal.

Clause 11: The method of any one of Clauses 1-10, wherein the precoding misalignment is a first precoding misalignment and the method further comprises: estimating a second precoding misalignment between the second transmission and a third transmission; and estimating a third channel for the third transmission based on the second precoding misalignment.

Clause 12: The method of Clause 11, wherein the estimation of the second channel is further based on the second precoding misalignment.

Clause 13: The method of any one of Clauses 1-12, wherein the precoding misalignment is based on a first initial channel estimation of the first transmission and a second initial channel estimation of the second transmission.

Clause 14: The method of Clause 13, wherein estimating the precoding misalignment comprises iteratively estimating the precoding misalignment.

Clause 15: One or more apparatuses, comprising: one or more memories comprising executable instructions; and one or more processors configured to execute the executable instructions and cause the one or more apparatuses to perform a method in accordance with any one of Clauses 1-14.

Clause 16: One or more apparatuses configured for wireless communications, comprising: one or more memories; and one or more processors, coupled to the one or more memories, configured to cause the one or more apparatuses to perform a method in accordance with any one of Clauses 1-14.

Clause 17: One or more apparatuses configured for wireless communications, comprising: one or more memories; and one or more processors, coupled to the one or more memories, configured to perform a method in accordance with any one of Clauses 1-14.

Clause 18: One or more apparatuses, comprising means for performing a method in accordance with any one of Clauses 1-14.

Clause 19: One or more non-transitory computer-readable media comprising executable instructions that, when executed by one or more processors of one or more apparatuses, cause the one or more apparatuses to perform a method in accordance with any one of Clauses 1-14.

Clause 20: One or more computer program products embodied on one or more computer-readable storage media comprising code for performing a method in accordance with any one of Clauses 1-14.

Clause 21: One or more apparatuses configured for wireless communications, comprising: a processing system that includes one or more processors and one or more memories coupled with the one or more processors, the processing system configured to cause the one or more apparatuses to perform a method in accordance with any one of Clauses 1-14.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a SoC, a SiP, or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an ASIC, or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "the processor," etc.), unless otherwise specifically stated, should be understood to refer to one or more elements (e.g., "one or more processors," or the like). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus for wireless communications, comprising a processing system that includes one or more processors and one or more memories coupled with the one or more processors, the processing system configured to cause a wireless communications device to:

receive a first transmission comprising a first reference signal and a second transmission comprising a second reference signal, wherein at least one of:

the first transmission comprises a first physical resource block group (PRG) and the second transmission comprises a second PRG, or the first transmission is in a first time resource and the second transmission is in a second time resource;

estimate, using the first reference signal and the second reference signal, a precoding misalignment between the first transmission and the second transmission; and estimate, based on the precoding misalignment, a first channel for the first transmission and a second channel for the second transmission.

2. The apparatus of claim 1, wherein the first transmission overlaps the second transmission in time.

3. The apparatus of claim 1, wherein the precoding misalignment indicates a difference between a first precoder of the first transmission and a second precoder of the second transmission, wherein the second precoder is different than the first precoder.

4. The apparatus of claim 3, wherein the second precoder is unknown to the wireless communications device.

5. The apparatus of claim 4, wherein the first precoder is also unknown to the wireless communications device.

6. The apparatus of claim 1, wherein to cause the wireless communications device to estimate the precoding misalignment, the processing system is configured to cause the wireless communications device to estimate the precoding misalignment based on maximizing a joint probability of observations of aligned reference signals given a first channel estimation derived from the first reference signal and a second channel estimation derived from the second reference signal.

7. The apparatus of claim 1, wherein to cause the wireless communications device to estimate the first channel and the second channel, the processing system is configured to cause the wireless communications device to:

estimate the first channel using a first channel estimation derived from the first reference signal; and estimate the second channel using the precoding misalignment and a second channel estimation derived from the second reference signal.

8. The apparatus of claim 7, wherein to cause the wireless communications device to estimate the second channel, the processing system is configured to cause the wireless communications device to correct the second channel estimation to remove the precoding misalignment.

9. The apparatus of claim 1, wherein the first transmission comprises a first plurality of reference signals, the second transmission comprises a second plurality of reference signals, and estimating the first channel and the second channel is based on a first proper subset of the first plurality of reference signals and a second proper subset of the second plurality of reference signals.

10. The apparatus of claim 1, wherein the estimation of the precoding misalignment is based on a first channel estimation within a transmission of the first transmission or the second transmission, and based on a second channel estimation of the second transmission using the first reference signal.

11. The apparatus of claim 1, wherein the precoding misalignment is a first precoding misalignment and the processing system is configured to cause the wireless communications device to:

estimate a second precoding misalignment between the second transmission and a third transmission; and estimate a third channel for the third transmission based on the second precoding misalignment.

12. The apparatus of claim 11, wherein the estimation of the second channel is further based on the second precoding misalignment.

13. The apparatus of claim 1, wherein the precoding misalignment is based on a first initial channel estimation of the first transmission and a second initial channel estimation of the second transmission.

14. The apparatus of claim 13, wherein to cause the wireless communications device to estimate the precoding misalignment, the processing system is configured to cause the wireless communications device to iteratively estimate the precoding misalignment.

15. A method for wireless communications by a wireless communications device, comprising:

receiving a first transmission comprising a first reference signal and a second transmission comprising a second reference signal, wherein at least one of:

the first transmission comprises a first physical resource block group (PRG) and the second transmission comprises a second PRG, or the first transmission is in a first time resource and the second transmission is in a second time resource;

estimating, using the first reference signal and the second reference signal, a precoding misalignment between the first transmission and the second transmission; and estimating, based on the precoding misalignment, a first channel for the first transmission and a second channel for the second transmission.

16. The method of claim 15, wherein the first transmission overlaps the second transmission in time.

17. The method of claim 15, wherein the precoding misalignment indicates a difference between a first precoder of the first transmission and a second precoder of the second transmission, wherein the second precoder is different than the first precoder.

18. The method of claim 17, wherein the second precoder is unknown to the wireless communications device.

19. The method of claim 18, wherein the first precoder is also unknown to the wireless communications device.

20. An apparatus for wireless communications comprising:

means for receiving a first transmission comprising a first reference signal and a second transmission comprising a second reference signal, wherein at least one of:

the first transmission comprises a first physical resource block group (PRG) and the second transmission comprises a second PRG, or the first transmission is in a first time resource and the second transmission is in a second time resource;

means for estimating, using the first reference signal and the second reference signal, a precoding misalignment between the first transmission and the second transmission; and means for estimating, based on the precoding misalignment, a first channel for the first transmission and a second channel for the second transmission.

* * * * *